(12) United States Patent
Burke et al.

(10) Patent No.: US 8,566,549 B1
(45) Date of Patent: Oct. 22, 2013

(54) SYNCHRONIZING PERFORMANCE REQUIREMENTS ACROSS MULTIPLE STORAGE PLATFORMS

(75) Inventors: Barry Burke, Tyngsboro, MA (US); Alexandr Veprinsky, Brookline, MA (US); Amnon Naamad, Brookline, MA (US); John T. Fitzgerald, Mansfield, MA (US)

(73) Assignee: EMC Corporation, Hopkinton, MA (US)

( * ) Notice: Subject to any disclaimer, the term of this patent is extended or adjusted under 35 U.S.C. 154(b) by 896 days.

(21) Appl. No.: 12/319,122

(22) Filed: Dec. 31, 2008

(51) Int. Cl.
*G06F 12/00* (2006.01)

(52) U.S. Cl.
USPC ..... 711/168; 711/114; 711/162; 711/E12.103

(58) Field of Classification Search
USPC ........................... 711/114, 162, 168, E12.103
See application file for complete search history.

(56) References Cited

U.S. PATENT DOCUMENTS

| | | | |
|---|---|---|---|
| 5,206,939 A * | 4/1993 | Yanai et al. ....................... 711/4 |
| 5,742,792 A | 4/1998 | Yanai et al. |
| 5,778,394 A | 7/1998 | Galtzur et al. |
| 5,845,147 A | 12/1998 | Vishlitzky et al. |
| 5,857,208 A | 1/1999 | Ofek |
| 6,266,784 B1 * | 7/2001 | Hsiao et al. ..................... 714/6.3 |
| 6,484,173 B1 | 11/2002 | O'Hare et al. |
| 6,697,367 B1 | 2/2004 | Halstead et al. |
| 6,704,730 B2 | 3/2004 | Moulton et al. |
| 6,826,711 B2 | 11/2004 | Moulton et al. |
| 6,862,632 B1 | 3/2005 | Halstead et al. |
| 6,976,139 B2 | 12/2005 | Halstead et al. |
| 7,000,086 B2 | 2/2006 | Meiri et al. |
| 7,054,883 B2 | 5/2006 | Meiri et al. |
| 7,062,648 B2 | 6/2006 | Moulton et al. |
| 7,088,703 B2 | 8/2006 | O'Hare et al. |
| 7,194,504 B2 | 3/2007 | Moulton |
| 7,305,536 B2 * | 12/2007 | Tabata et al. ................... 711/165 |
| 7,313,719 B1 * | 12/2007 | Elahee .......................... 714/6.11 |
| 7,340,461 B2 | 3/2008 | Vishlitzky et al. |
| 7,380,082 B2 | 5/2008 | Meiri et al. |

(Continued)

OTHER PUBLICATIONS

Russell Kay, "Sidebar: How ECC Works", Computerworld, Nov. 1, 2004, pp. 1-5, http://www.computerworld.com/s/article/97039/Sidebar_How_ECC_Works.*

(Continued)

*Primary Examiner* — Edward Dudek, Jr.
*Assistant Examiner* — Christopher Birkhimer
(74) *Attorney, Agent, or Firm* — Muirhead and Saturnelli, LLC

(57) ABSTRACT

Synchronization of data layouts and resource utilizations at one or more remote replica sites with the workload and data tiering decisions being made at the primary site allows for an efficient and effective workload support transfer in the event of site failover from a primary site to a remote site. Relevant data access information about workload being supported at the primary site is collected and from that raw information, characterized data access information is generated that condenses the raw data access information or otherwise provides relevant encapsulated information about the raw data access information. The characterized data access information is transmitted to the one or more remote sites allowing each remote site to make its own independent decisions on how best to utilize its available resources to match the performance requirements currently being supported by the primary site.

19 Claims, 24 Drawing Sheets

FIG. 9

(56) References Cited

U.S. PATENT DOCUMENTS

| | | | |
|---|---|---|---|
| 7,406,487 B1 * | 7/2008 | Gupta et al. | 1/1 |
| 7,444,483 B2 * | 10/2008 | Taguchi et al. | 711/156 |
| 2001/0034795 A1 | 10/2001 | Moulton et al. | |
| 2002/0188592 A1 * | 12/2002 | Leonhardt et al. | 707/1 |
| 2005/0097130 A1 * | 5/2005 | Hankin | 707/104.1 |
| 2007/0288401 A1 * | 12/2007 | Hood et al. | 705/400 |
| 2009/0070541 A1 | 3/2009 | Yochai | |

OTHER PUBLICATIONS

The PC Guide, "RAID Levels 0+1 (01) and 1+0 (10)", Aug. 31, 2000, pp. 1-2, http://web.archive.org/web/20000831211455/http://www.pcguide.com/ref/hdd/perf/raid/levels/multLevel01-c.html.*

The PC Guide, "RAID Level 5", Sep. 2, 2000, pp. 1-2, http://web.archive.org/web/20000902024531/http://www.pcguide.com/ref/hdd/perf/raid/levels/singleLevel5-c.html.*

* cited by examiner

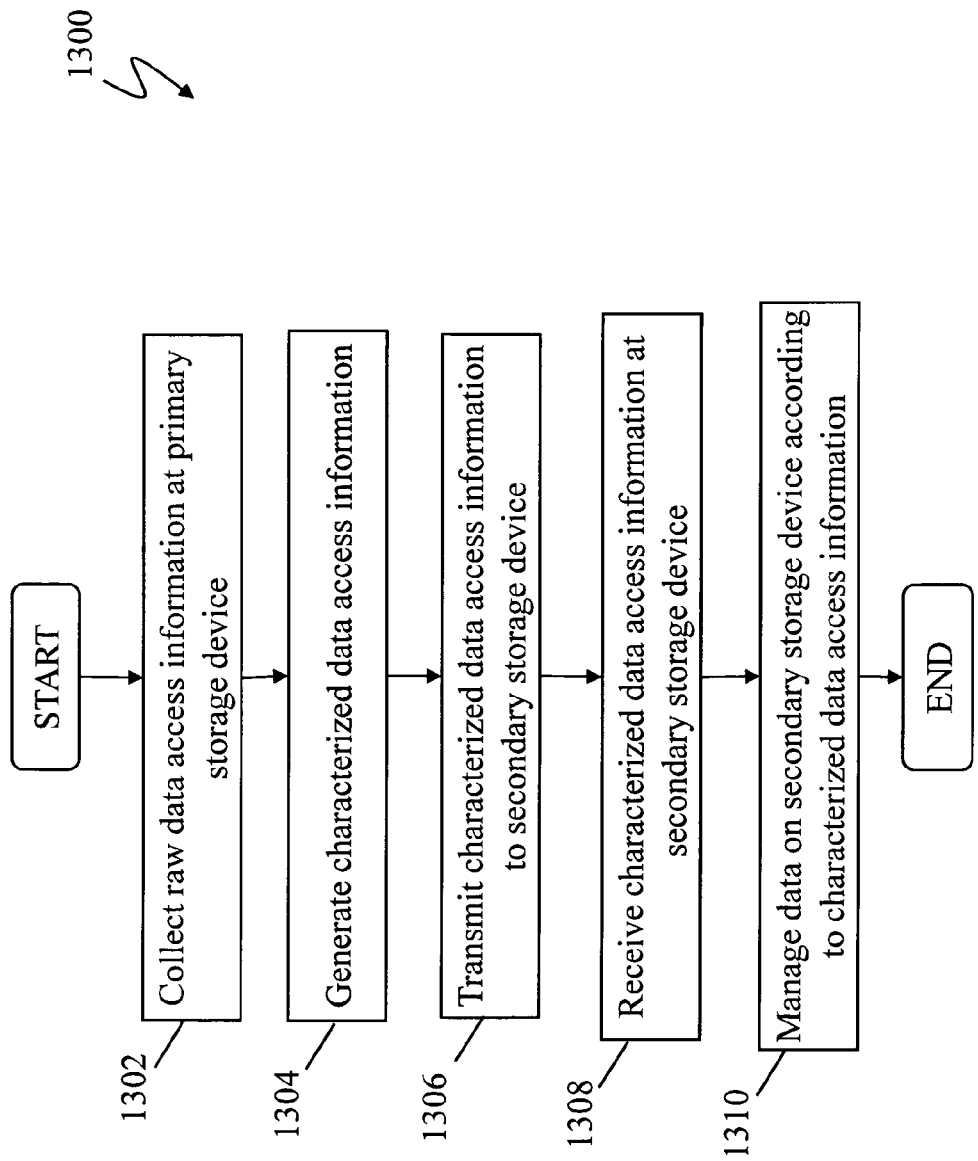

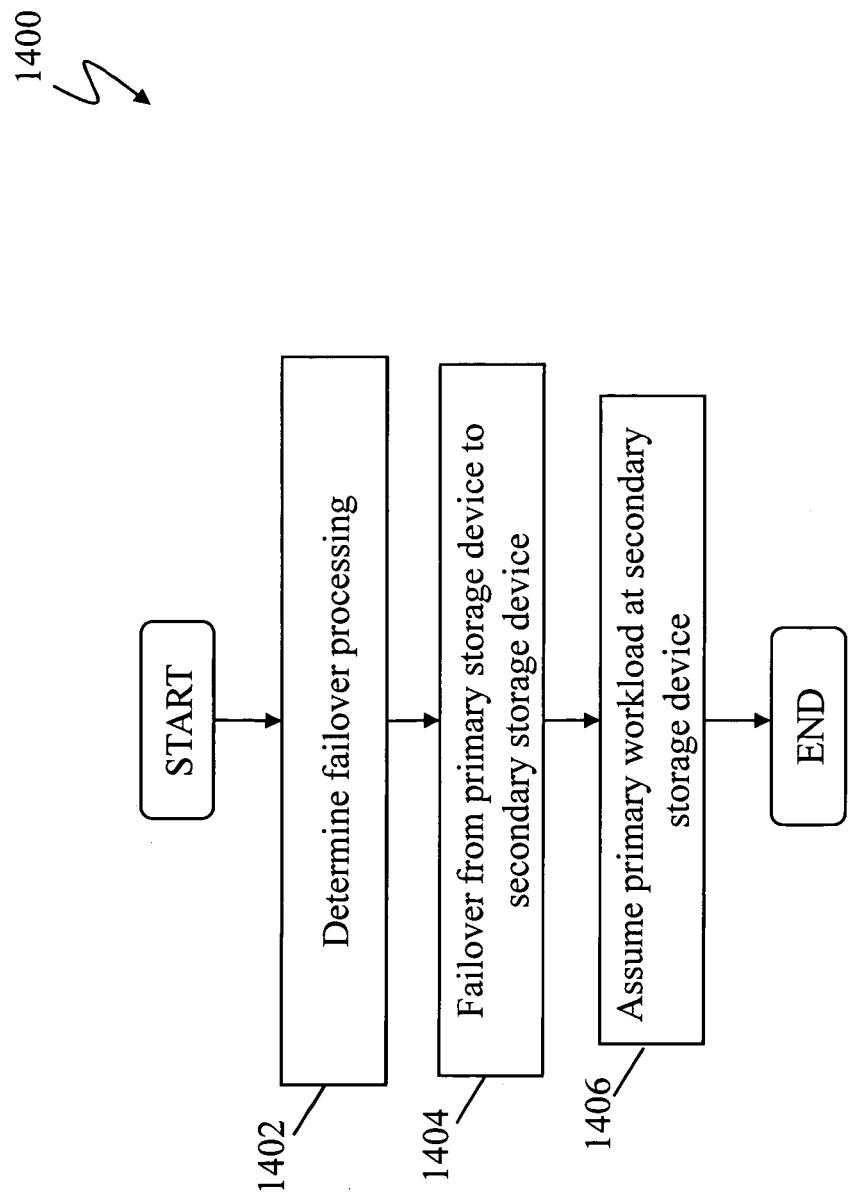

SYNCHRONIZING PERFORMANCE REQUIREMENTS ACROSS MULTIPLE STORAGE PLATFORMS

TECHNICAL FIELD

This application relates to computer storage devices and, more particularly, to the field of managing data stored on computer storage devices.

BACKGROUND OF THE INVENTION

Host processor systems may store and retrieve data using storage devices containing a plurality of host interface units (host adapters), disk drives, and disk interface units (disk adapters). Such storage devices are provided, for example, by EMC Corporation of Hopkinton, Mass. and disclosed in U.S. Pat. No. 5,206,939 to Yanai et al., U.S. Pat. No. 5,778,394 to Galtzur et al., U.S. Pat. No. 5,845,147 to Vishlitzky et al., and U.S. Pat. No. 5,857,208 to Ofek, which are incorporated herein by reference. The host systems access the storage device through a plurality of channels provided therewith. Host systems provide data and access control information through the channels of the storage device and the storage device provides data to the host systems also through the channels. The host systems do not address the disk drives of the storage device directly, but rather, access what appears to the host systems as a plurality of logical volumes. Different sections of the logical volumes may or may not correspond to the actual disk drives.

Information Lifecycle Management (ILM) concerns the management of data throughout the data's lifecycle. The value of data may change over time and, accordingly, the needs for the storage and accessibility of the data may change during the lifecycle of the data. For example, data that is initially accessed often may, over time, become less valuable and the need to access that data become more infrequent. It may not be efficient for such data infrequently accessed to be stored on a fast and expensive storage device. On the other hand, older data may suddenly become more valuable and, where once accessed infrequently, become more frequently accessed. In this case, it may not be efficient for such data to be stored on a slower storage system when data access frequency increases.

In some instances, it may be desirable to copy data from one storage device to another. For example, if a host writes data to a first storage device, it may be desirable to copy that data to a second storage device provided in a different location so that if a disaster occurs that renders the first storage device inoperable, the host (or another host) may resume operation using the data of the second storage device. Such a capability is provided, for example, by a Remote Data Facility (RDF) product provided by EMC Corporation of Hopkinton, Mass., e.g., Symmetrix Remote Data Facility (SRDF). With RDF, a first storage device, denoted the "primary storage device" (or "R1") is coupled to the host. One or more other storage devices, called "secondary storage devices" (or "R2") receive copies of the data that is written to the primary storage device by the host. The host interacts directly with the primary storage device, but any data changes made to the primary storage device are automatically provided to the one or more secondary storage devices using RDF. The primary and secondary storage devices may be connected by a data link, such as an ESCON link, a Fibre Channel link, and/or a Gigabit Ethernet link. The RDF functionality may be facilitated with an RDF adapter (RA) provided at each of the storage devices.

There may be a number of different types of RDF transmission. Synchronous RDF mode allows synchronous data transfer where, after an initial data write from a host to a primary storage device, the data is transferred from the primary storage device to a secondary storage device using RDF. Receipt of the data is acknowledged by the secondary storage device to the primary storage device which then provides a write acknowledge back to the host for the initial data write. Another possibility for RDF transmission is to have the host write data to the primary storage device and have the primary storage device copy data asynchronously to the secondary storage device in the background. One product using asynchronous replication techniques is by EMC Corporation and known as SRDF/A in which data sets are transferred to the secondary array at defined intervals. Using SRDF/A, data to be copied from one storage array to another in chunks that are assigned sequence numbers based on when the data was written by the host. For further discussion of SRDF/A systems and techniques, see U.S. Pat. Nos. 7,000,086 to Meiri, et al., entitled "Virtual Ordered Writes," and 7,054,883 to Meiri, et al. entitled "Virtual Ordered Writes for Multiple Storage Devices," which are both incorporated herein by reference.

In connection with data replication using RDF systems, one issue that may occur is discrepancies in data storage management between R1 and R2 devices when ILM techniques are used. For example, date that is accessed frequently on an R1 device may be stored and managed at a location on the R1 device that is suitable for the need for frequent access of that data. However, when replicated to the R2 device, that same data, existing as a data backup copy, may not be accessed as frequently. Accordingly, the data on the R2 device, although being a copy of the R1 data, may be stored and managed differently on the R2 device than on the R1 device. In situations of failover to the R2 device, or other uses for the R2 device, the R2 device may not immediately be able to support the workload as the new primary device because the data copy stored thereon may not be stored as efficiently or effectively as on the R1 device. Transferring all information between the R1 and R2 devices during normal operation to maintain the same ILM storage management on each of the devices may not be a practical solution due to the amount of information transfer that this would require, among other reasons.

Accordingly, it would be desirable to provide a system that allows for the efficient management of data in a storage system using data replication techniques among multiple storage devices.

SUMMARY OF THE INVENTION

According to the system described herein, a method for managing data among a plurality of storage devices includes collecting raw data access information about data stored on a first storage device of the plurality of storage devices. The raw data access information may be characterized to generate characterized data access information, wherein the characterized data access information contains less information than the raw data access information. The characterized data access information may be transmitted to a second storage device of the plurality of storage devices. Data stored on the second storage device may be managed according to the characterized data access information wherein the data stored on the second storage device corresponds to the data stored on the first storage device. The management of data stored on the second storage device may be performed independently of management of data stored on the first storage device. The data stored on the second storage device may be managed to match performance requirements being supported by the first storage device. Managing data on the second storage device may include storing the data among a plurality of storage tiers of the second storage device. A feature of a first storage tier of the plurality of storage tiers may be different from a feature of a second storage tier of the plurality of storage tiers. The data stored on the second storage device may be a copy of the data stored on the first storage device. The characterized data access information may include information concerning at least one of: an access rate of the data, frequency of use of the data, a time of last use of the data, and source/requestor information of the data. The characterized data access information may include statistics of the raw data access information and may be transmitted periodically to the second data storage device.

According further to the system described herein, a computer-readable storage medium, having executable code stored thereon that is executable by at least one processor, includes executable code that collects raw data access information about data stored on a first storage device of the plurality of storage devices. Executable code is included that characterizes the raw data access information to generate characterized data access information, wherein the characterized data access information contains less information than the raw data access information. Executable code is included that transmits the characterized data access information to a second storage device of the plurality of storage devices. Executable code is included that manages data stored on the second storage device according to the characterized data access information, wherein the data stored on the second storage device corresponds to the data stored on the first storage device. The management of data stored on the second storage device may be performed independently of management of data stored on the first storage device. The data stored on the second storage device may be managed to match performance requirements being supported by the first storage device. The executable code that manages data on the second storage device may include executable code that stores the data among a plurality of storage tiers of the second storage device. A feature of a first storage tier of the plurality of storage tiers may be different from a feature of a second storage tier of the plurality of storage tiers. The data stored on the second storage device may be a copy of the data stored on the first storage device. The characterized data access information may include information concerning at least one of: an access rate of the data, frequency of use of the data, a time of last use of the data, and source/requestor information of the data. The characterized data access information may include statistics of the raw data access information and may be transmitted periodically to the second data storage device.

According further to the system described herein, a computer storage system includes a plurality of interconnected directors, wherein at least some of the directors handle reading and writing data for the computer storage device and a plurality of disk drives, coupled to at least some of the directors, that store data for the computer storage device. A computer-readable storage medium of at least one of the directors that stores executable code is provided. The computer-readable medium includes executable code that collects raw data access information about data stored on a first storage device of the plurality of storage devices. Executable code is provided that characterizes the raw data access information to generate characterized data access information, wherein the characterized data access information contains less information than the raw data access information. Executable code is provided that transmits the characterized data access information to a second storage device of the plurality of storage devices. Executable code is provided that manages data stored on the second storage device according to the characterized data access information, wherein the data stored on the second storage device corresponds to the data stored on the first storage device. The management of data stored on the second storage device may be performed independently of management of data stored on the first storage device. The data stored on the second storage device may be managed to match performance requirements being supported by the first storage device. Managing data on the second storage device may include storing the data among a plurality of storage tiers of the second storage device. A feature of a first storage tier of the plurality of storage tiers may be different from a feature of a second storage tier of the plurality of storage tiers. The data stored on the second storage device may be a copy of the data stored on the first storage device. The characterized data access information may include information concerning at least one of: an access rate of the data, frequency of use of the data, a time of last use of the data and source/requestor information of the data. The characterized data access information may include statistics of the raw data access information and may be transmitted periodically to the second data storage device.

BRIEF DESCRIPTION OF THE DRAWINGS

Embodiments of the system are described with reference to the several figures of the drawings, described as follows.

FIG. 20 is a flow diagram showing a process for generating and transmitting characterized data access information from a primary volume to a secondary volume according to an embodiment of the system described herein.

FIG. 21 is a flow diagram showing a process of failover from a primary volume to a secondary volume that has undergone fully-automated storage tiering processing according to the characterized data access information received about the data access workload on the primary volume according to an embodiment of the system described herein.

DETAILED DESCRIPTION OF VARIOUS EMBODIMENTS

Referring now to the figures of the drawings, the figures comprise a part of this specification and illustrate exemplary embodiments of the described system. It is to be understood that in some instances various aspects of the system may be shown schematically or may be shown exaggerated or altered to facilitate an understanding of the system.

Figure 1:
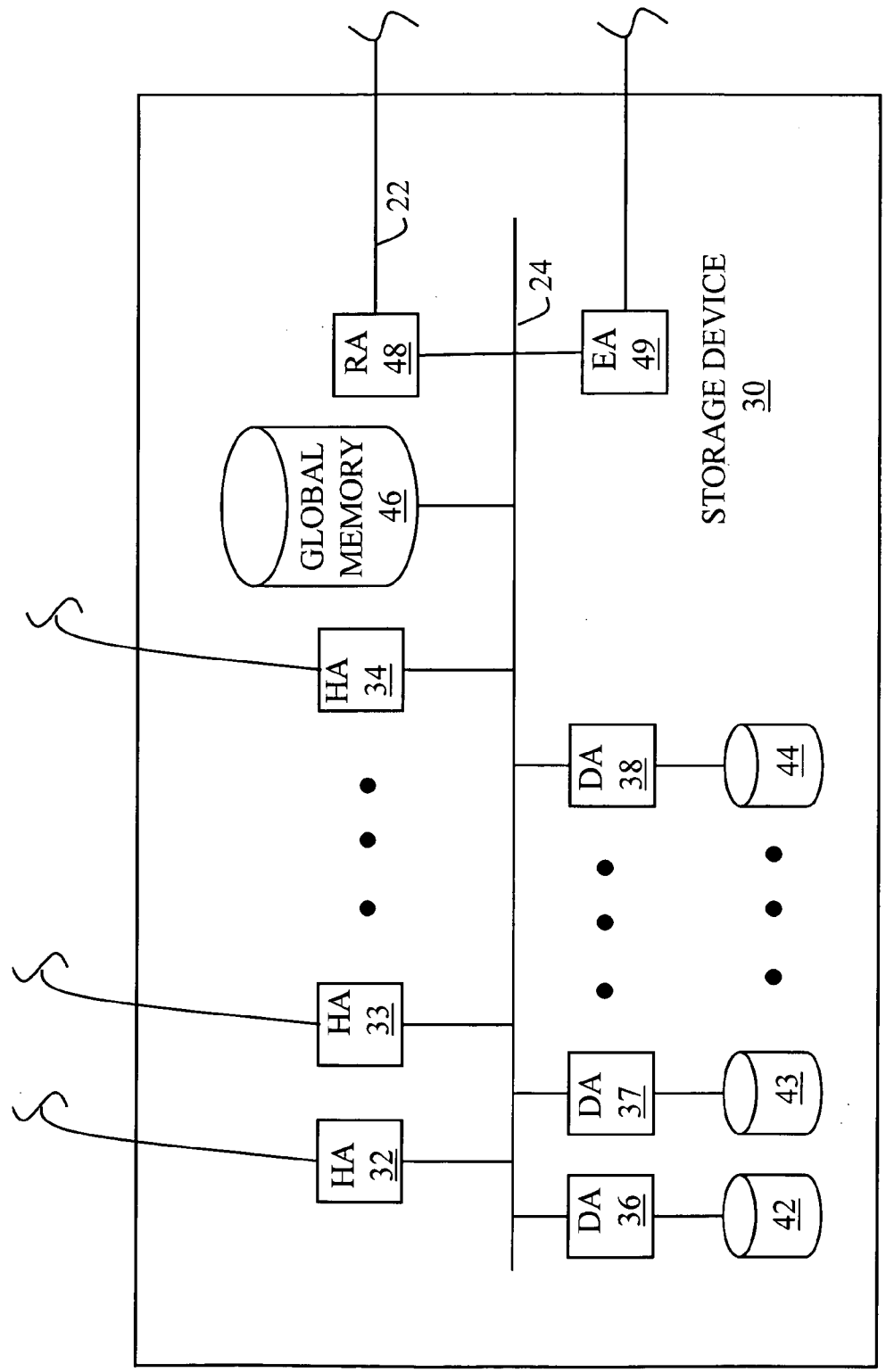
FIG. 1 is a schematic diagram showing a plurality of hosts and a data storage device in connection with an embodiment of the system described herein.

FIG. 1 is a schematic illustration showing a storage device 30 that includes a plurality of host adapters (HA) 32-34, a plurality of disk adapters (DA) 36-38 and a plurality of disk drives 42-44. The disk drives 42-44 should be understood as representing any appropriate type of storage media, including, without limitation, DRAM cache, flash or other solid-state storage device, tape, optical media, and/or any combination of permanent, semi-permanent and temporally-limited storage media. Each of the disk drives 42-44 is coupled to a corresponding one of the DA's 36-38. Although FIG. 1 shows a one-for-one correspondence between the DA's 36-38 and the disk drives 36-38, it should be understood that it is possible to couple more than one disk drive to a DA and/or to couple more than one DA to a disk drive. The storage device 30 also includes a global memory 46 that may be accessed by the HA's 32-34 and the DA's 36-38. The storage device 30 also includes an RDF adapter (RA) 48 that may also access the global memory 46. The RA 48 may communicate with one or more additional remote storage devices (not shown) and/or one or more other remote devices (not shown) via a data link 22. The storage device also includes an external storage adaptor (EA) 49 that may be used to communicate with one or more other storage devices (not shown) that could either be the same type of storage device as the storage device 30 or could be a different type of storage device. The HA's 32-34, the DA's 36-38, the global memory 46, the RA 48 and the EA 49 may be coupled to a bus 24 that is provided to facilitate communication therebetween. In various embodiments, additional RA's and/or EA's may be incorporated into the storage device 30.

Each of the HA's 32-34 may be coupled to one or more host computers (not shown) that access the storage device 30. The host computers (hosts) access data on the disk drives 42-44 through the HA's 32-34 and the DA's 36-38. The global memory 46 contains a cache memory that holds tracks of data read from and/or to be written to the disk drives 42-44 as well as storage for tables that may be accessed by the HA's 32-34, the DA's 36-38, the RA 48, and the EA 49. Note that, for the discussion herein, blocks of data are described as being a track or tracks of data. However, it will be appreciated by one of ordinary skill in the art that the system described herein may work with any appropriate incremental amount, or section, of data, including possibly variable incremental amounts of data and/or fixed incremental amounts of data and/or logical representations of data, including (but not limited to) compressed data, encrypted data, or pointers into de-duplicated data dictionaries.

Figure 2:
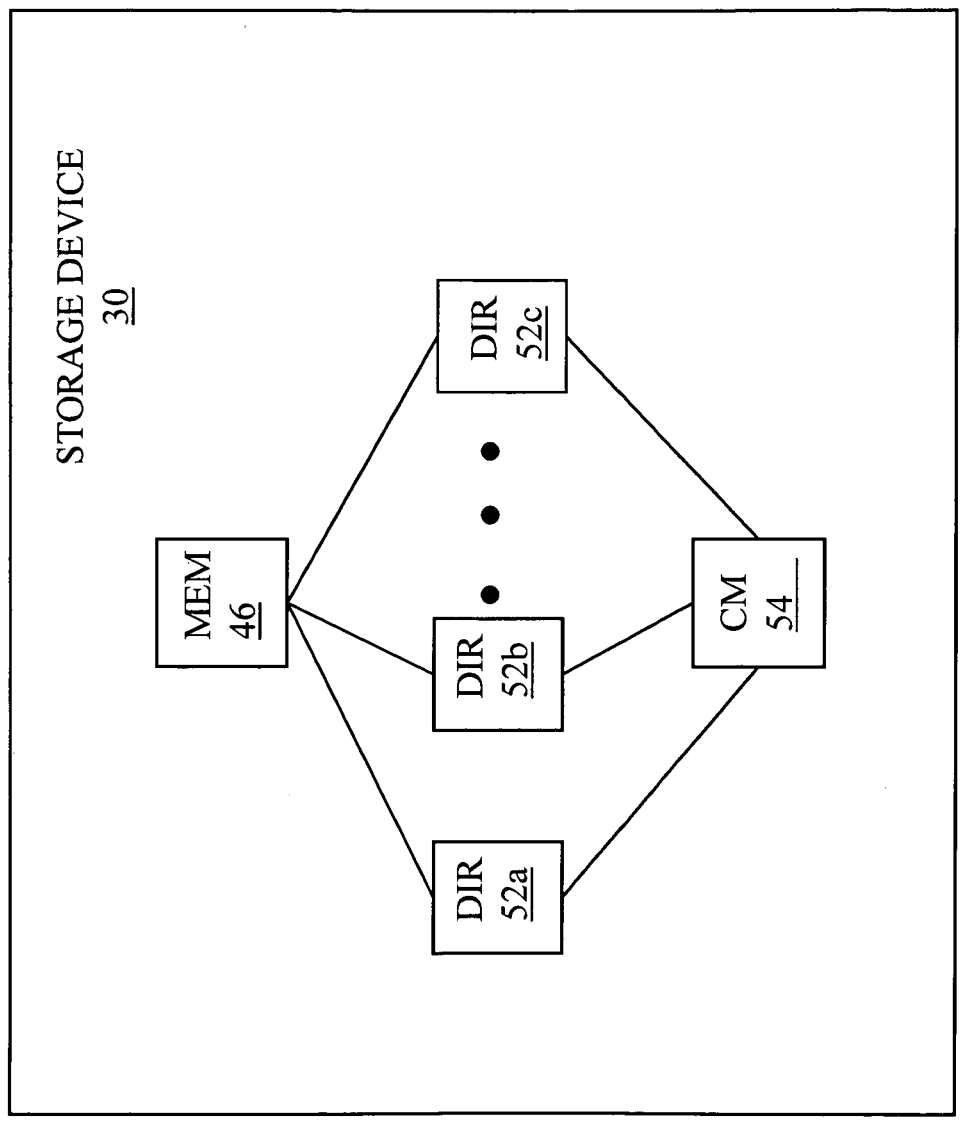
FIG. 2 is a schematic diagram showing a storage device, memory, a plurality of directors, and a communication module in connection with an embodiment of the system described herein.

FIG. 2 is schematic diagram showing an embodiment of the storage device 30 where each of a plurality of directors 52a-52c are coupled to the memory 46. Each of the directors 52a-52c may represent one or more of the HA's 32-34, the DA's 36-38, the RA 48 and/or the EA 49. In an embodiment disclosed herein, there may be up to sixty-four directors coupled to the memory 46. Of course, for other embodiments, there may be a higher or lower maximum number of directors that may be used.

FIG. 2 also shows an optional communication module (CM) 54 that provides an alternative communication path between the directors 52a-52c. Each of the directors 52a-52c may be coupled to the CM 54 so that any one of the directors 52a-52c may send a message and/or data to any other one of the directors 52a-52c without needing to go through the memory 46. The CM 54 may be implemented using conventional MUX/router technology where a sending one of the directors 52a-52c provides an appropriate address to cause a message and/or data to be received by an intended receiving one of the directors 52a-52c. Some or all of the functionality of the CM 54 may be implemented using one or more of the directors 52a-52c so that, for example, the directors 52a-52c may be interconnected directly with the interconnection functionality being provided on each of the directors 52a-52c. In addition, a sending one of the directors 52a-52c may be able to broadcast a message to all of the other directors 52a-52c at the same time.

In some embodiments, one or more of the directors 52a-52c may have multiple processor systems thereon and thus may be able to perform functions for multiple directors. In some embodiments, at least one of the directors 52a-52c having multiple processor systems thereon may simultaneously perform the functions of at least two different types of directors (e.g., an HA and a DA). Furthermore, in some embodiments, at least one of the directors 52a-52c having multiple processor systems thereon may simultaneously perform the functions of different types of director and perform other processing with the other processing system. Generally, the system described herein could work with any appropriate hardware configuration, including configurations where at least some of the memory 46 is distributed among at least some of the directors 52a-52c and in configurations where a number of core processors are coupled to a generic interface card.

The system described herein is suitable for use with the technique of thin provisioning. Thin provisioning allows for the creation of logical volumes of storage space where allocation of physical storage space occurs only when space is actually needed (e.g., when data is written in the first time to the storage space). Logical storage space may be identified to a user as being available even though no physical storage space has been committed, at least initially. When data is written to the logical storage space, physical storage space is drawn for use from a pool of physical storage space, as further described elsewhere herein. In addition, as described in more detail elsewhere herein, stored data may be moved between physical locations using the storage infrastructure described herein.

Figure 3:
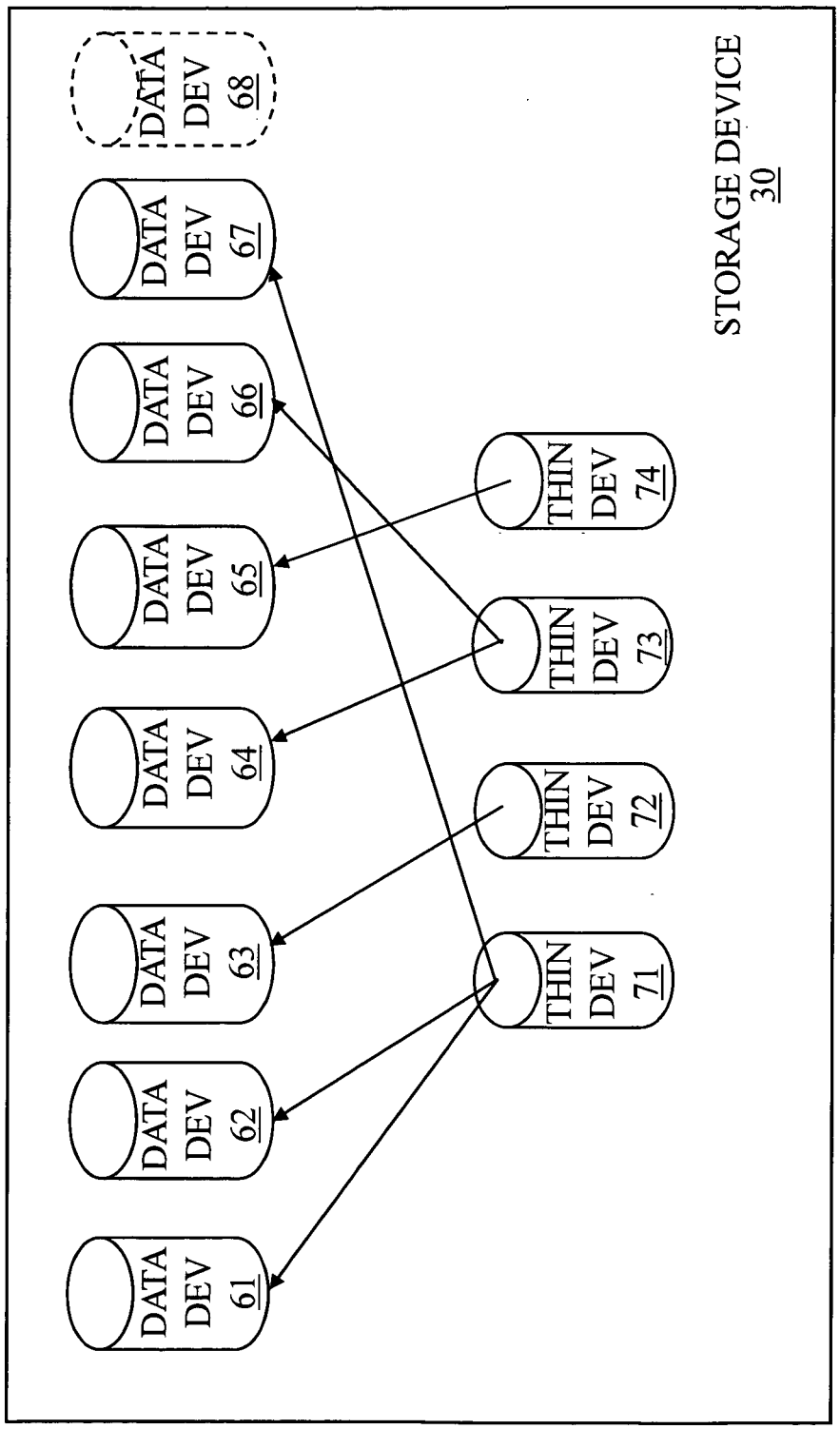
FIG. 3 is a schematic diagram showing a storage device including thin devices and data devices in connection with an embodiment of the system described herein.

FIG. 3 is a schematic diagram showing the storage device 30 as including a plurality of data devices 61-68. Data devices 61-67 may be implemented as logical devices like standard logical devices provided in a Symmetrix data storage device. In some embodiments, the data devices 61-67 may not be directly useable (visible) to hosts coupled to the storage device 30. Each of the data devices 61-67 may correspond to a portion (including a whole portion) of one or more of the disk drives 42-44. Thus, for example, the data device 61 may correspond to the disk drive 42, may correspond to a portion of the disk drive 42, or may correspond to a portion of the disk drive 42 and a portion of the disk drive 43. The data devices 61-67 may be designated as corresponding to different classes, so that different ones of the data devices 61-67 correspond to different physical storage having different relative access speeds or RAID protection type (or some other relevant distinguishing characteristic or combination of characteristics), as further discussed elsewhere herein. The data device 68 is illustrated with broken lines to indicate that the data device 68 does not yet exist but may be created, as further discussed elsewhere herein.

The storage device 30 may also include one or more thin devices 71-74. Each of the thin devices 71-74 may appear to a host coupled to the storage device 30 as a logical volume (logical device) containing a contiguous block of data storage. Each of the thin devices 71-74 may contain tables that point to some or all of the data devices 61-67 (or portions thereof), as further discussed elsewhere herein. In some instances, the thin devices 71-74 may be concatenated to form a metavolume of thin devices. In some embodiments, only one thin device may be associated with the same data device while, in other embodiments, multiple thin devices may be associated with the same data device.

In some embodiments, it may be possible to implement the system described herein using storage areas, instead of storage devices. Thus, for example, the thin devices 71-74 may be thin storage areas, the data devices 61-67 may be standard logical areas, and so forth. In some instances, such an implementation may allow for hybrid logical devices where a single logical device has portions that behave as a data device and/or portions that behave as a thin device. Accordingly, it should be understood that, in appropriate instances, references to devices in the discussion herein may also apply to storage areas that may or may not correspond directly with a storage device.

Figure 4:
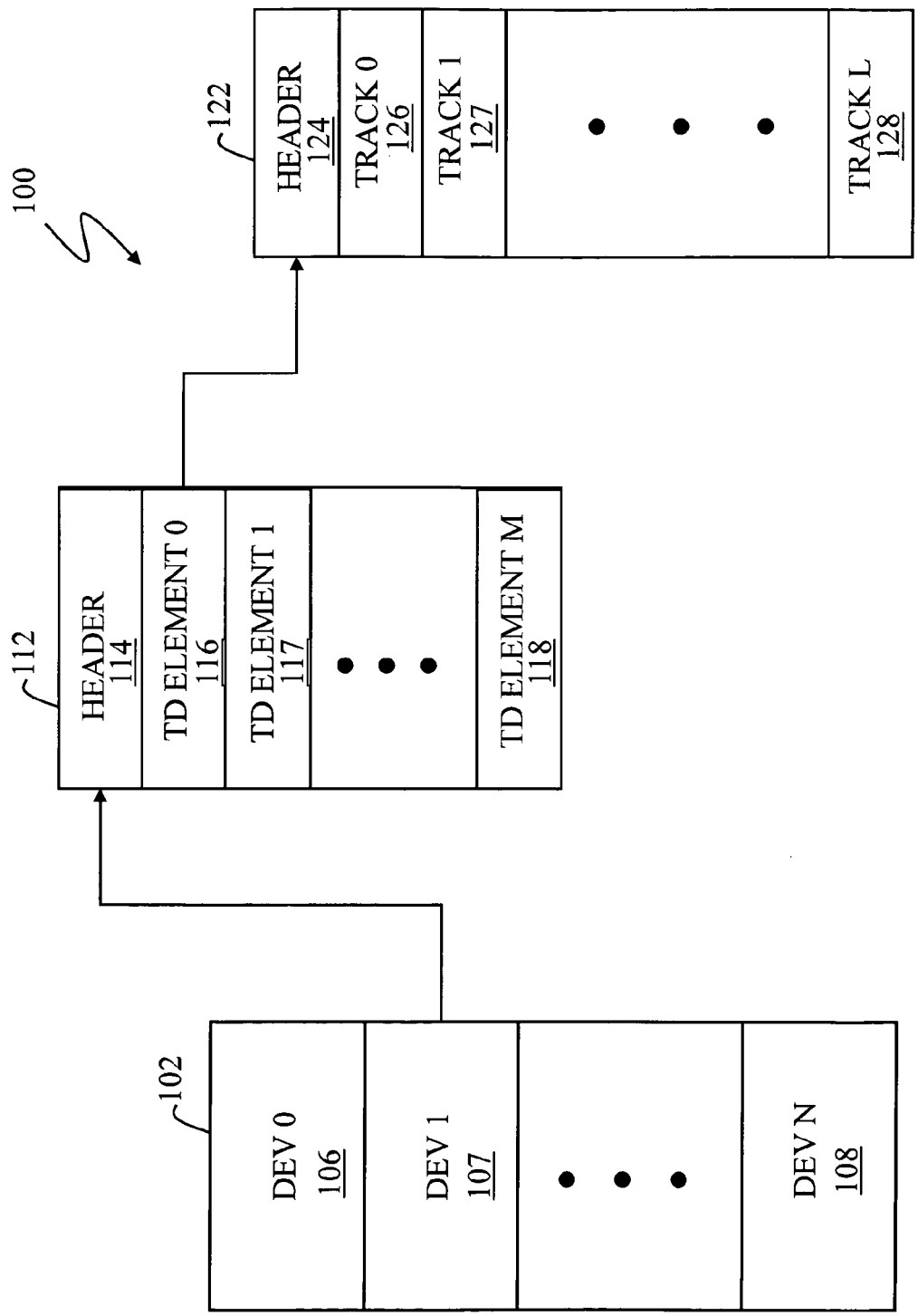
FIG. 4 is a schematic diagram illustrating tables that are used to keep track of device information in connection with an embodiment of the system described herein.

FIG. 4 is a diagram 100 illustrating tables that are used to keep track of device information. A first table 102 corresponds to all of the devices used by a storage device or by an element of a storage device, such as an HA and/or a DA. The table 102 includes a plurality of logical device (logical volume) entries 106-108 that correspond to all the logical devices used by the storage device (or portion of the storage device). The entries in the table 102 may include information for thin devices, for data devices, for standard logical devices, for virtual devices, for BCV devices, and/or any or all other types of logical devices used in connection with the system described herein.

Each of the entries 106-108 of the table 102 correspond to another table that may contain information for one or more logical volumes, such as thin device logical volumes. For example, the entry 107 may correspond to a thin device table 112. The thin device table 112 may include a header 114 that contains overhead information, such as information identifying the corresponding thin device, information concerning the last used data device and/or other information including counter information, such as a counter that keeps track of used group entries (described below). The header information, or portions thereof, may be available globally to the storage device 30.

The thin device table 112 may include one or more group elements 116-118, that contain information corresponding to a group of tracks on the data device. A group of tracks may include one or more tracks, the number of which may be configured as appropriate. In an embodiment herein, each group has sixteen tracks, although this number may be configurable or dynamically adjustable based on criteria described elsewhere herein.

One of the group elements 116-118 (for example, the group element 116) of the thin device table 112 may identify a particular one of the data devices 61-67 having a track table 122 that contains further information, such as a header 124 having overhead information and a plurality of entries 126-128 corresponding to each of the tracks of the particular one of the data devices 61-67. The information in each of the entries 126-128 may include a pointer (either direct or indirect) to the physical address on one of the disk drives 42-44 of the storage device 30 (or a remote storage device if the system is so configured) that maps to the logical address(es) of the particular one of the data devices 61-67. Thus, the track table 122 may be used in connection with mapping logical addresses of the logical devices corresponding to the tables 102, 112, 122 to physical addresses on the disk drives 42-44 of the storage device 30.

The tables 102, 112, 122 may be stored in the global memory 46 of the storage device 30. In addition, the tables corresponding to particular logical devices accessed by a particular host may be stored (cached) in local memory of the corresponding one of the HA's 32-36. In addition, the RA 48 and/or the DA's 36-38 may also use and locally store (cache) portions of the tables 102, 112, 122.

Figure 5:
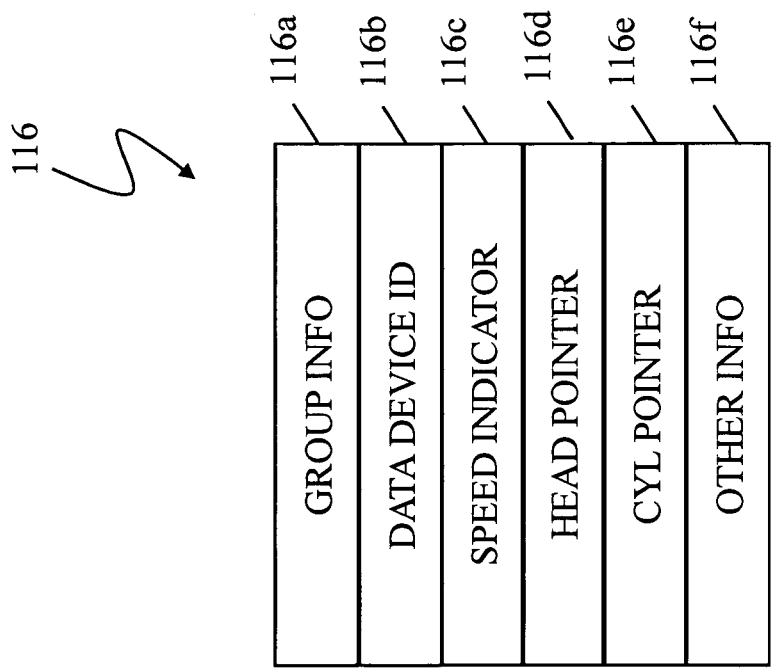
FIG. 5 is a schematic diagram showing a group element of a thin device table in connection with an embodiment of the system described herein.

FIG. 5 is a schematic diagram illustrating a group element 116 of the thin device table 112 in connection with an embodiment of the system described herein. The group element 116 may includes a plurality of entries 116a-116f. The entry 116a may provide group information, such as a group type that indicates whether there has been physical address space allocated for the group. The entry 116b may include information identifying one (or more) of the data devices 61-67 that correspond to the group (i.e., the one of the data devices 61-67 that contains pointers for physical data for the group). The entry 116c may include other identifying information for the one of the data devices 61-67, including a speed indicator that identifies, for example, if the data device is associated with a relatively fast access physical storage (disk drive) or a relatively slow access physical storage (disk drive). Other types of designations of data devices are possible (e.g., relatively expensive or inexpensive, RAID protection type, etc.). The entry 116d may be a pointer to a head of the first allocated track for the one of the data devices 61-67 indicated by the data device ID entry 116b. Alternatively, the entry 116d may point to header information of the data device track table 122 immediately prior to the first allocated track. The entry 116e may identify a cylinder of a first allocated track for the one the data devices 61-67 indicated by the data device ID entry 116b. The entry 116f may contain other information corresponding to the group element 116 and/or the corresponding thin device. In other embodiments, entries of the group table 116 may identify a range of cylinders of the thin device and a corresponding mapping to map cylinder/track identifiers for the thin device to tracks/cylinders of a corresponding data device. In an embodiment, the size of the group element 116 may be eight bytes.

Accordingly, a thin device presents a logical storage space to one or more applications running on a host where different portions of the logical storage space may or may not have corresponding physical storage space associated therewith. However, the thin device is not mapped directly to physical storage space. Instead, portions of the thin storage device for which physical storage space exists are mapped to data devices, which are logical devices that map logical storage space of the data device to physical storage space on the disk drives 42-44. Thus, an access of the logical storage space of the thin device results in either a null pointer (or equivalent) indicating that no corresponding physical storage space has yet been allocated, or results in a reference to a data device which in turn references the underlying physical storage space.

Figure 6:
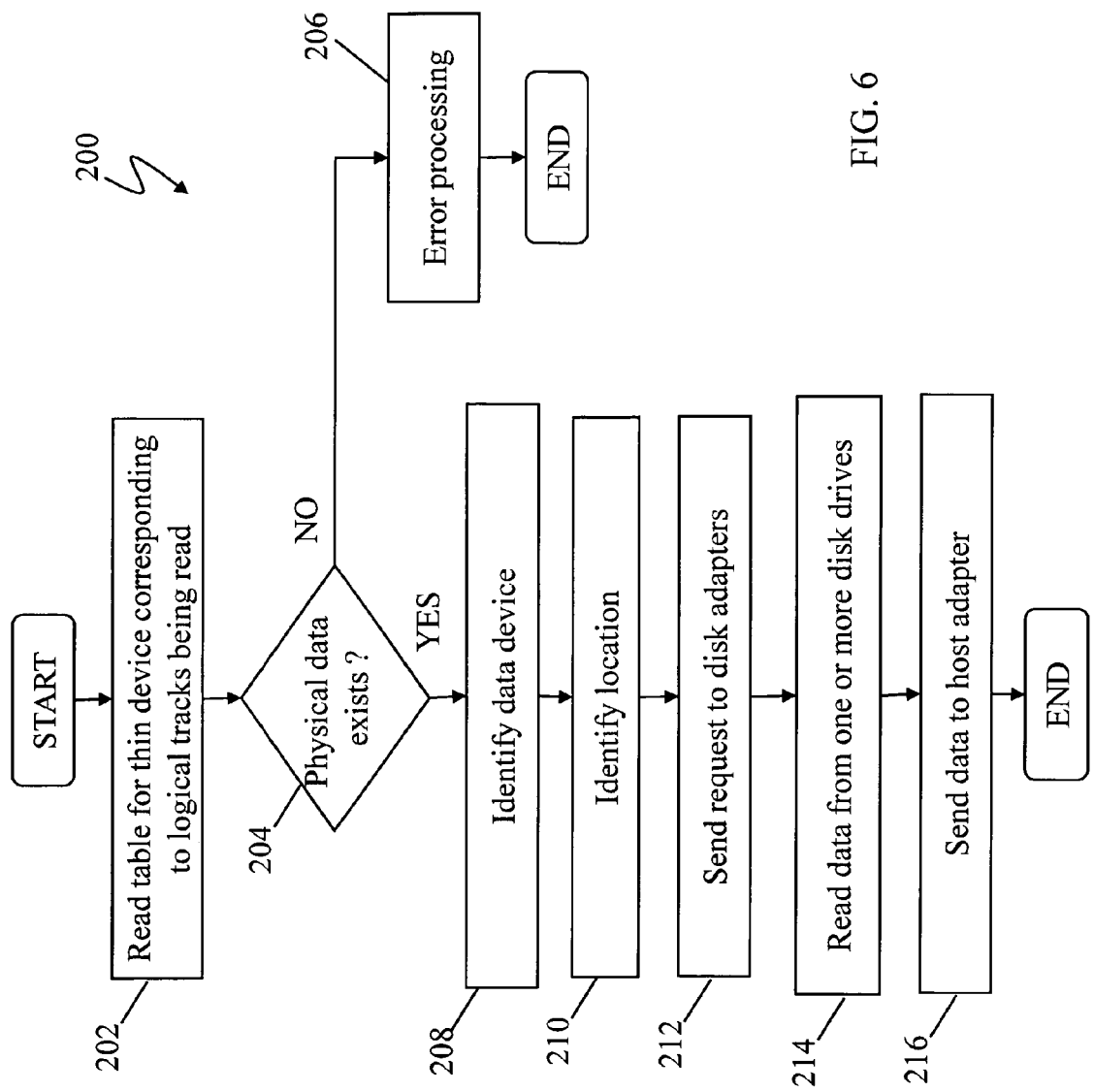
FIG. 6 is a flow diagram illustrating processing for handling a read of one or more logical tracks of a thin device in connection with an embodiment of the system described herein.

FIG. 6 is a flow diagram 200 illustrating processing for handling a read of one or more logical tracks of one of the thin devices 71-74 in an embodiment of the system described herein. In a step 202, an appropriate one of the host adapters 32-34 reads the group table 112 of the one of the thin devices 71-74 corresponding to the logical tracks being read. After the step 202, at a test step 204, it is determined whether the logical tracks identified from the group table 112 corresponds to any of the data devices 61-67 (i.e., if there is physical data corresponding to the logical tracks being read). If there is no corresponding physical data (meaning that no logical track(s) were ever written), then processing proceeds to a step 206 where error processing is performed, such as returning a NULL value to the host. Other appropriate error processing may be performed at the step 206. After the step 206, processing is complete.

If it is determined at the step 204 that there is physical data corresponding to the logical tracks being read, then processing proceeds to a step 208 where one or more of the data devices 61-67 associated with the logical tracks being read are identified from the group table 112. After the step 208, processing proceeds to a step 210 where the track table 122 is read from the identified one or more of the data devices 61-67 and the corresponding location of the physical data (i.e., cylinder and track) is determined. As further discussed elsewhere herein, physical storage space may be provided in connection with one data device and/or by a concatenation of multiple data devices or portions thereof. Logical storage space of the physical devices maps to logical storage space. After the step 210, processing proceeds to a step 212 where a request may be sent to one or more disk adapters 36-38 corresponding to disk drives 42-44 that provide the physical storage space associated with the identified one of the data devices 61-67 and corresponding location information. After the step 212, processing proceeds to a step 214 where the physical data is read. Note that the data may be stored in a cache or other memory (for example, the memory 46) in connection with being read. In some cases, if the data being read is already in the cache, then the processing at the step 212 and following steps may not be necessary. Note also that reading the data may include updating any metadata used to provide the processing described herein, such as the time last accessed, the host/user making the request, frequency of use, and/or any other appropriate metric. After the step 214, processing proceeds to a step 216 where the data may be received by an appropriate one of the host adapters 32-34 (e.g., by reading the memory 46). After the step 216, processing is complete.

Figure 7:
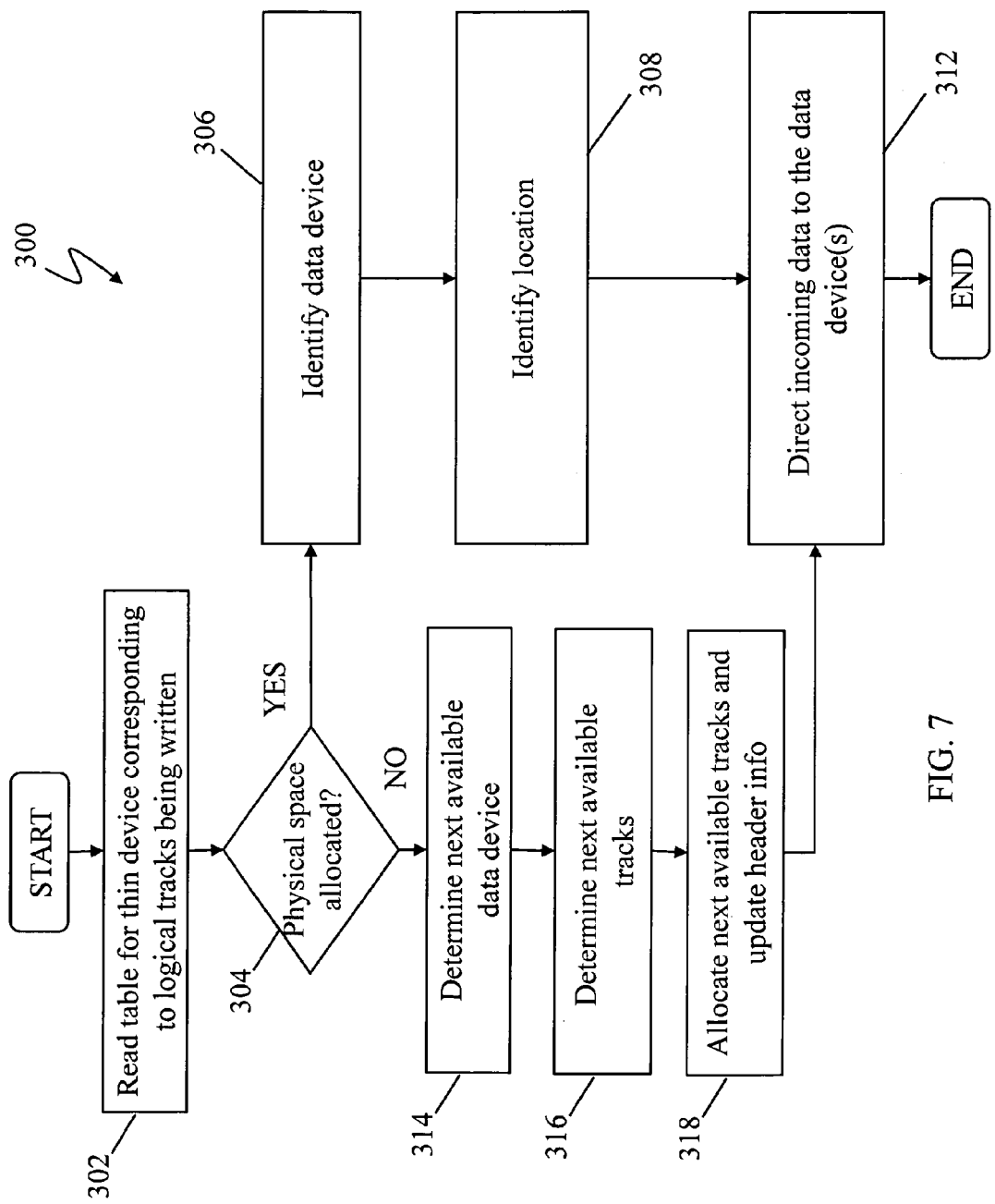
FIG. 7 is a flow diagram illustrating processing for handling a write of one or more logical tracks to the thin device in connection with an embodiment of the system described herein.

FIG. 7 is a flow diagram 300 illustrating processing for handling a write of logical track(s) to one or more of the thin device(s) 71-74 in connection with the system described herein. At a step 302, an appropriate one of the host adapters 32-34 reads the group table 112 of the one of the thin device(s) 71-74 corresponding to the logical tracks being written.

Following the step 302 is a test step 304 where it is determined whether physical space had been previously allocated (i.e., in a prior write operation) for the logical tracks being written. If so, then processing proceeds to a step 306 where the data device that includes the logical tracks is identified. After the step 306, is a step 308 where the track table 122 is read from the identified one or more of the data devices 61-67 and the corresponding location of the physical data (i.e., cylinder and track) is determined. As further discussed elsewhere herein, physical storage space may be provided in connection with one data device and/or by a concatenation of multiple data devices or portions thereof. Logical storage space of the physical devices maps to logical storage space. Following the step 308 processing proceeds to a step 312 where the data being written is directed to the appropriate physical storage space. The incoming data overwrites the appropriate portion of the data where directed. After the step 312, processing is complete.

If it is determined at the step 304 that there is no physical storage that has been allocated for the logical track(s) being written, then control transfers from the step 304 to a step 314, where a next available data device identifier (i.e., the data device 68) is determined. This information may be obtained from the header 114 of the device table 112. In an embodiment herein, data device identifiers are provided by numbers so that a next available data device identifier is simply one more than a last allocated data device. However, as discussed in more detail elsewhere herein, selection of a data device at the step 314 may include application of other criteria.

After the step 314, processing proceeds to a step 316 where available physical storage space on the disk drives 42-44 is determined. In an embodiment herein, available physical storage space is allocated sequentially from one or more of the disk drives 42-44. Following the step 316 is a step 318 where a request may be sent to a disk adapter 36-38 (or possibly the RA 48 and/or the EA 49) to allocate the physical storage space for the write. Also at the step 318, header info is updated to reflect the newly allocated data device and physical tracks. After the step 318, processing proceeds to the step 312, discussed above, where the data being written is directed to the one or more data devices. After the step 312, processing is complete.

After the read and write processes illustrated in FIGS. 6 and 7, information concerning access of the data, such as access frequency, time of last access or use and/or other characteristics and statistics, may be updated and stored by the system described herein. The updated data access information or other characteristic information of the data and/or any portion of the data may, for example, be stored as an entry in a group element of the thin device table 112 (for example, the entry 116f of the group element 116 as shown in FIG. 5). Alternatively, the data characteristic information may be stored in a memory, such as the global memory 46 of the storage device 30, and a pointer to this information stored in the group element 116. Other implementations for storing and access of the data characteristic information are possible.

The allocation of the physical storage space for a thin device at the time of writing the data, as well as the policies that govern the allocation, may be transparent to a user. For example, a user's inquiry into how much storage space is available on a particular thin device may indicate a maximum amount of physical storage space that could be allocated for a thin storage device (provisioned storage space) even though the corresponding physical storage space had not yet been allocated. In an alternative embodiment, the policy for the thin device may be to report something less than the total maximum that could be allocated. In some embodiments, used physical storage space may not exceed 30% of the provisioned storage space.

In an embodiment herein, different portions of the physical data may be automatically moved between different physical disk drives or other storage devices with the same or different characteristics according to one or more policies. For example, data may be initially allocated to a particular fast disk drive, but a portion of the data that has not been used over a period of time (for example, three weeks) may be automatically moved, according to the system described herein, to a slower (and perhaps less expensive) disk drive. The physical data may then be automatically moved back to the faster disk drive if the data is subsequently used and/or accessed according to a policy or other criteria (for example, accessed twice in any given week), as further described herein. Thus, the system described herein may operate to automatically move data between disk drives or other storage devices within the same machine according to the one or more policies.

A policy may be configured by an administrator on a system-wide level or may be specific to a particular user on a specific logical device. The system described herein allows for the remapping of physical data based on policy criteria or other statistics. For example, the policy may be based on the last time data was used and/or accessed. Alternatively, the policy may be based on anticipated use of data over specific times and/or dates. For example, data that is expected to be used at a particular time may be stored on (or relocated to) relatively fast disk drives and then moved to relatively slow disk drives when it is expected that the data will not be used again for a lengthy period of time. Moreover, different policies and/or criteria may be implemented corresponding to different users and/or different levels of importance or security of data. For example, it may be known that user A accesses particular data more frequently than user B and, accordingly, the policy for moving physical data according to the system described herein may be to leave more data associated with user A on the relatively fast disk drive as compared with the data associated with user B. Alternatively, user A may access data that is generally of a higher level of importance or requires higher security than that of user B and, accordingly, the system described herein may maintain and/or move more data associated with user A on a disk drive that is relatively more reliable, available and/or secure as compared with the data associated with user B.

In an embodiment herein, data may be moved between physical disk drives (or other physical storage) having different characteristics, such as speed, cost, reliability, availability, security and/or other characteristics. As discussed elsewhere herein, logical data devices may be established having different classes corresponding to characteristics of the physical disk drives to which the data devices are mapped. Further, it should be noted that any section of the logical device may be moved according to the system described herein based on the characteristics of the data (and governed by default or specific policies).

Figure 8:
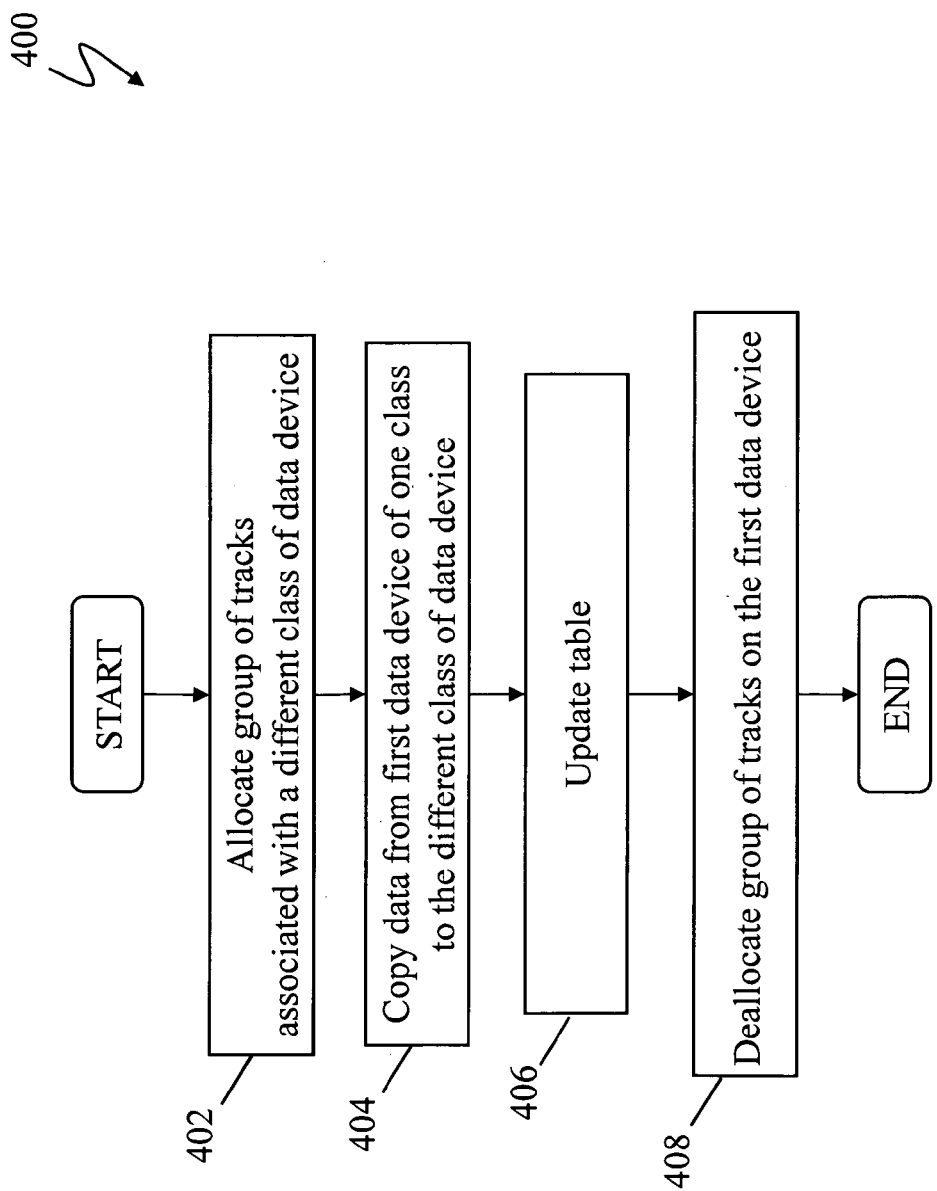
FIG. 8 is a flow diagram illustrating processing for copying and remapping physical data within a storage device in connection with an embodiment of the system described herein.

FIG. 8 is a flow diagram 400 illustrating processing for copying and remapping physical data according to the system described herein. In a step 402, a group of tracks is allocated on a data device having a second class than a data device of a first class, where the first and second classes are different. For example, the data device having a different class may be mapped to a physical disk drive that is slower than that of the data device of the first class, as further discussed elsewhere herein. After the step 402, processing proceeds to a step 404 where data associated with the data device of the first class is copied to a location corresponding to the data device of the second class. After the step 404, processing proceeds to a step 406 where the group table of the thin device is updated in accordance with the remapping. After the step 406, processing proceeds to a step 408 where the group of tracks associated with the data device of the first class, from which the data was copied, is deallocated, freeing the locations for future use.

Figure 9:
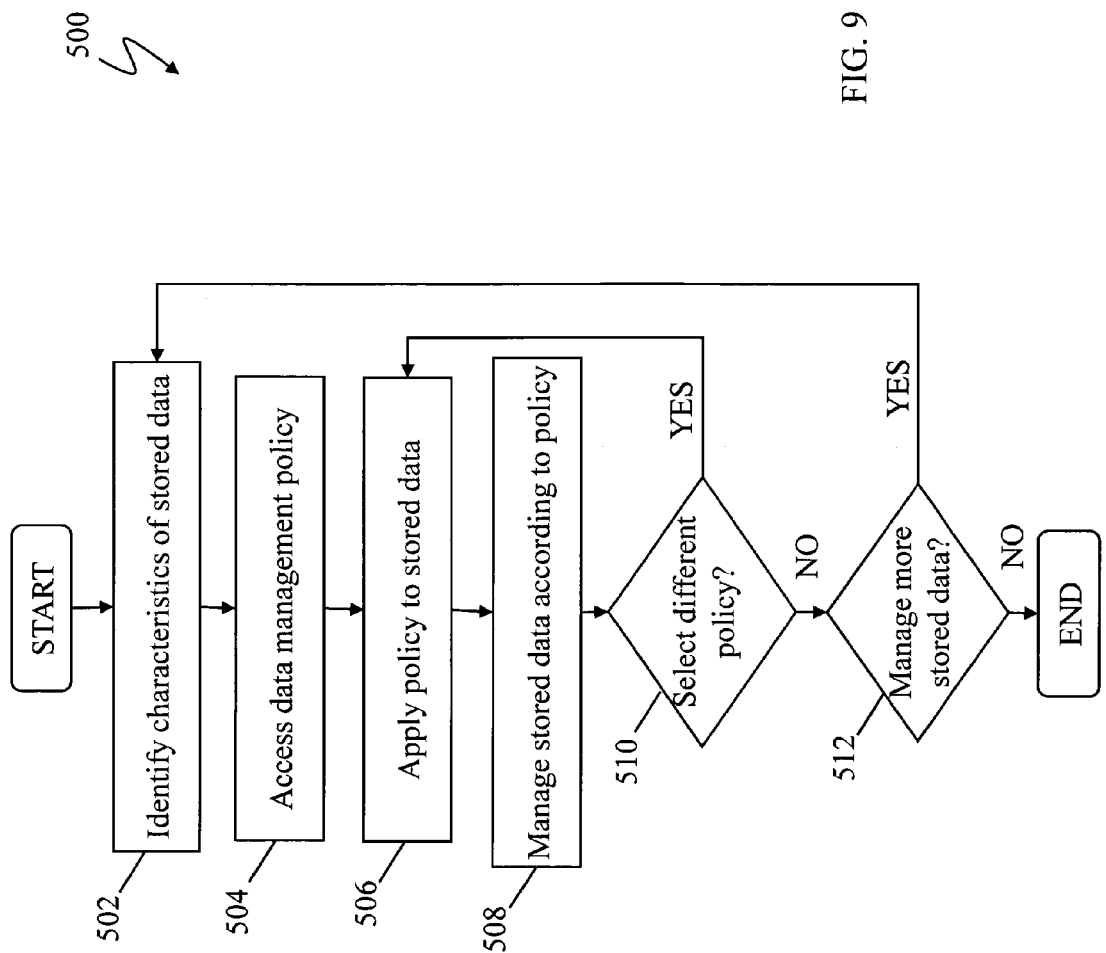
FIG. 9 is a flow diagram illustrating implementation of a policy to data storage and management in connection with an embodiment of the system described herein.

FIG. 9 is a flow diagram 500 illustrating implementation of a policy for data storage and management in connection with an embodiment of the system described herein. In a step 502, certain characteristics of stored data are identified (for example, from the group element 116, as discussed elsewhere herein). In various embodiments, the characteristics may include usage information such as when the stored data was last accessed and/or how often the stored data has been accessed over a specific time period (for example, hours, days, weeks, etc. . . . ). It is also possible to determine how long (on average or in aggregate) it has taken to service each specific I/O request to the data. As further discussed elsewhere herein, the characteristics may also include particular user information corresponding to the stored data. After the step 502, processing proceeds to a step 504 where policy information is accessed. The policy information provides the specific criteria used for data storage and management.

After the step 504, processing proceeds to a step 506 where the policy is applied to the stored data. The policy may include criteria used for managing stored data such as criteria concerning frequency of use of data and/or criteria with respect to specific users and/or other criteria, such as file name, file type, file path, requesting application, expected time to re-use of the data, temporary storage only, life expectancy of the data, data type (e.g., compressed, encrypted, de-duped) and/or protection requirements of the data (e.g., store on an encrypted tier). The policy may be applied to identify data for lifecycle management according to characteristics of entire data volumes or any portions thereof. The policy may also consider the access history, effective performance or other characteristics about the data that might be utilized to optimize the performance, cost, availability or retention requirements of the data.

After the step 506, processing proceeds to a step 508 where the data for which characteristics have been determined is managed according to the policy and based on the characteristics of the data. For example, data that is frequently used may be moved to a relatively fast storage device whereas data that has not been used over a certain period of time may be moved to a relatively slow storage device according to the data processing as discussed elsewhere herein. As noted herein, the data that is moved may be entire data volumes or portions thereof.

After the step 508, processing proceeds to a test step 510 where it is determined if another policy with other criteria should be applied to the stored data being managed. If an additional policy is to be applied, then processing proceeds to the step 506. If no further policies are to be applied then processing proceeds to a test step 512 where it is determined whether there is more data to be managed according to the system described herein. If there is further stored data to manage, then processing proceeds back to the step 502. If no further stored data is to be managed, then after the test step 512, processing is complete. In some cases, tracking, avoiding and resolving conflicting priorities would be handled to ensure that two policies do not create a "ping-pong" effect, moving data blocks up- and down-in a never ending cycle.

As discussed elsewhere herein, the data devices 61-67 may be associated with physical storage areas (e.g., disk drives, tape, solid state storage, etc.) having different characteristics. In various embodiments, the physical storage areas may include multiple tiers of storage in which each tier of storage areas and/or disk drives that may be ordered according to different characteristics and/or classes, such as speed, technology and/or cost. The thin devices 71-74 may appear to a host coupled to the storage device 30 as a logical volume (logical device) containing a contiguous block of data storage, as discussed herein. Each thin device 71-74 may correspond to a particular data device, a portion thereof and/or multiple data devices. Accordingly, each thin device 71-74 may map to storage areas across multiple storage tiers. As a result, although each thin device 71-74 may appear as containing a logically contiguous block of storage, each thin device 71-74 may allow for blocks of data to be transparently stored (and/or retrieved) from discontiguous storage pools made up of the varying classes of data storage devices. In this way, the granularity at which the system for tiered storage described herein operates may be smaller than at the file level, for example potentially as small as a single byte, but more practically at the granularity of a single logical block or collection of sequential data blocks. A data block may be of any size including file system or database logical block size, physical block, track or cylinder and/or other size. Multiple data blocks may be substantially the same size or different sizes, such as different size data blocks for different storage tiers or different sized data blocks within a single storage tier.

Figure 10:
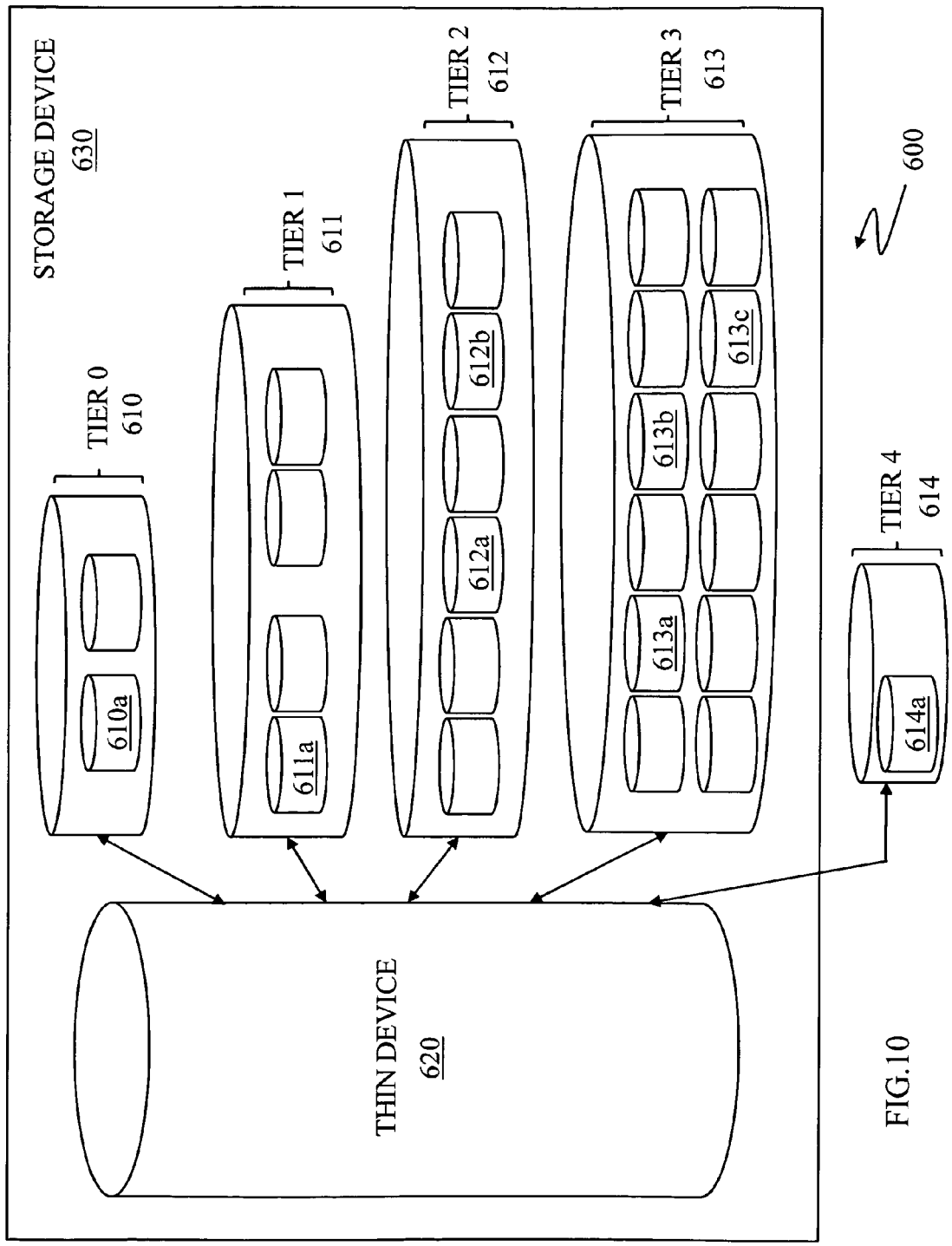
FIG. 10 is a schematic illustration of a fine grained tiered storage system according to an embodiment of the system described herein.

FIG. 10 is a schematic illustration of a fine grained tiered storage system 600 according to an embodiment of the system described herein. A storage device 630 is shown including a thin device 620, like the thin devices 71-74 discussed elsewhere herein, that may be coupled to multiple physical storage devices across multiple storage tiers. As discussed elsewhere herein, the storage tiers may be associated with data devices, like the data devices 61-67 discussed herein, so that, for example, there is one data device for each storage tier, one data device for multiple storage tiers, any portion of a data device for any portion of the pools of storage shown for the storage tiers, and/or any combinations thereof. For example, in an embodiment, a top tier storage pool 610 (e.g., tier 0) may include flash/solid state disk (SSD) drives that are relatively fast and expensive. Other storage pools 611-613 (e.g., tiers 1-3) may include disk drives of decreasing speeds or other configurations (i.e., 15 k rpm, 10 k rpm, 7.5 k rpm redundant array of independent disk (RAID) storage). The lowest tier of storage pool 614 (e.g., tier 4) may include, for example, tape storage, largest capacity disk drives (such as massive array of idle disks (MAID) storage). As illustrated, the last storage tier 614 may include storage devices external to the storage device 630 that may be suitable for long term storage of data that is infrequently accessed. However, note that external storage could have specific characteristics such as tape, or might perform additional processing to optimize the storage of data, such as de-duplication. In some embodiments, external storage might be used to support tier 2 or tier 3 class applications.

The thin device 620 may map to different storage areas (devices) across multiple tiers. As discussed herein, the granularity of the system described herein may be less than at the file level and allow for blocks of data of any size to be stored across multiple storage tiers 610-613 of the storage device 630 in a process that is transparent to the host and/or host application. For example, in the illustrated embodiment, the thin device 620 may map blocks of data to storage areas (devices) such as a storage area 610a in the pool of storage of the top storage tier 610, a storage area 611a in the pool of storage of the next storage tier 611, storage areas 612a, 612b in pool of storage of the next storage tier 612, and storage areas 613a, 613b, 613c in the pool of storage of the next storage tier 613. As discussed elsewhere herein, the last storage tier 614 may include external storage and the system described herein may map to a storage area 614a in the pool of storage in the tier 614.

At least one storage tier (e.g., the lowest storage tier 614) may include redundant data elimination (RDE)/de-duplication storage. RDE/de-duplication technology involves identifying multiple instances of data and storing only a single instances of that data (e.g., files, blocks, chunks, tracks, etc.) thereby eliminating redundant storage of the same data. RDE/de-duplication technologies may be particularly applicable for data that is accessed and/or changed infrequently. For example, RDE/de-duplication may be applied only for data blocks that have not been modified in a particular number of hours, days etc. Further, the system may include processing to separate data blocks, files etc. that have been de-duped in the case where the data is no longer suitable for RDE/de-duplication. For example, parts of two separate data files may initially be redundant and subjected to RDE to reduce storage space usage; however, if a write is subsequently requested for only one of the initially redundant data files, then the initially redundant data files may require separate processing and no longer be appropriate for RDE. RDE/de-duplication may allow fewer physical data blocks to support reads from multiple different users, applications, hosts etc. RDE/de-duplication is described in more detail in, for example, U.S. Pat. No. 6,704,730, which is incorporated by reference herein.

Mirroring (backup) of data may also be facilitated by tiered storage across multiple tiers according to the system described herein. For example, data that is accessed frequently may be stored on a fast storage device (tier 0) while a mirrored copy of the data that is not expected to be accessed may be stored on a slower storage device in one or more other tiers (e.g., tiers 1-4). Accordingly, the same data may be stored on storage devices of multiple tiers of storage pools.

Figure 11:
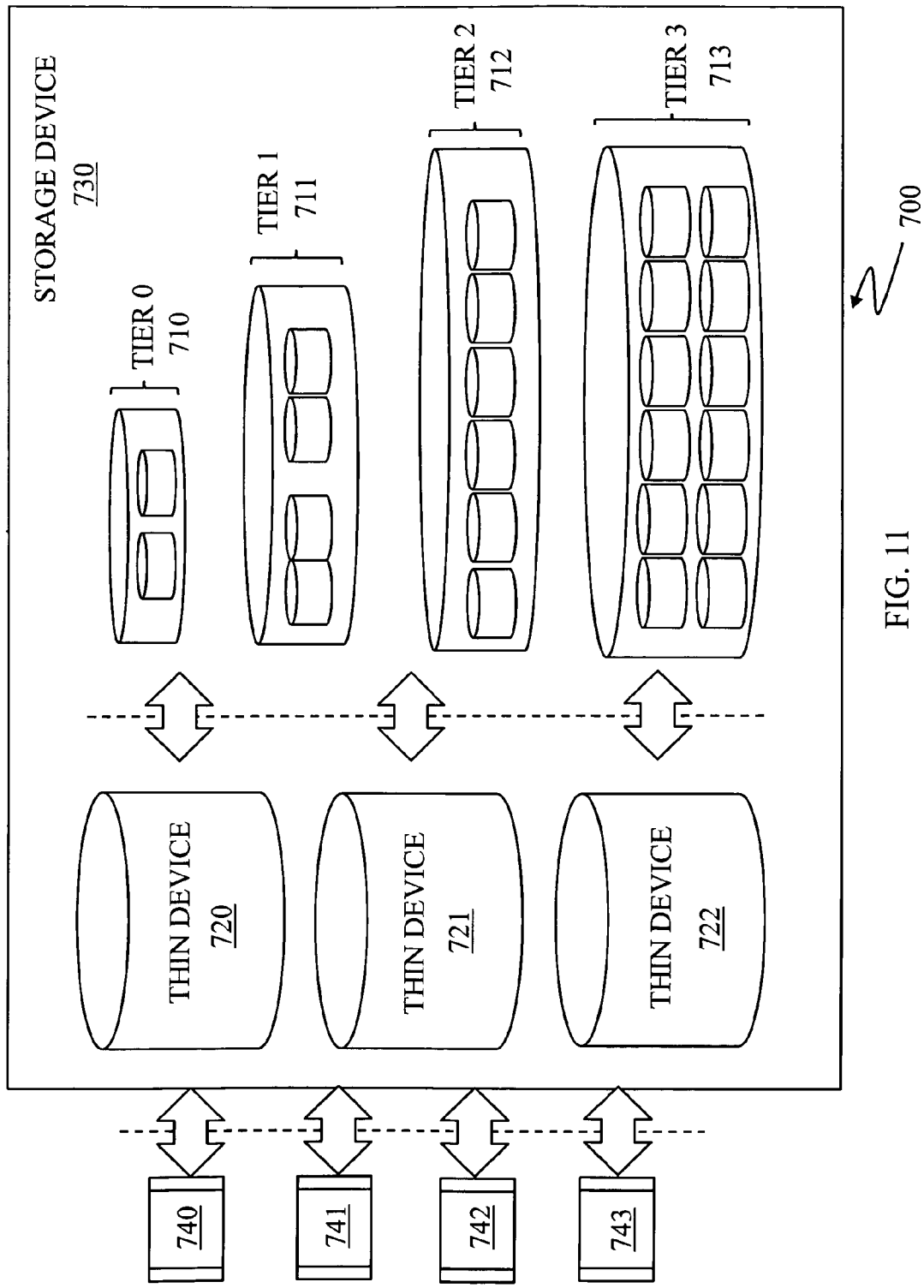
FIG. 11 is a schematic illustration showing a fine grained tiered storage system according to an embodiment of the system described herein.

FIG. 11 is a schematic illustration showing a fine grained tiered storage system 700 according to an embodiment of the system described herein. As illustrated, a storage device 730 includes multiple thin devices 720-722 and multiple pools of storage in multiple storage tiers 710-713. Host applications 740-744 and/or other entities (e.g., other storage devices, SAN switches, etc.) request data writes and data reads to and from the storage device 730. In various embodiments, multiple host applications 740-744 may share a single one of thin devices 720-722 and/or multiple thin devices 720-722 may be mapped to the same set of storage pools 710-713.

In an embodiment herein, a write target policy may be applied to data that is being written according to the system described herein. For example, data that is expected to be used frequently, for example database indices, may be initially written directly to fast storage (e.g., tier 0 flash/SSD storage) whereas data that is not expected to be accessed frequently, for example backup or archived data, may be initially written to slower storage devices (e.g., tier 4 MAID or external storage). In this manner, data is efficiently stored by targeting the write to storage areas and devices according to the estimated or expected access frequency of the data, beginning with the initial write of the data and also applying to subsequent data writes that jump across multiple tiers.

The process for determining the appropriate target storage location of the write of the data may be made based on the logical unit number (LUN) ID of the device from which the data is being written, where the storage device 730 may have or obtain information about the types of data stored on specific logical units. Alternatively, additional policies and capabilities may be enabled by adding host-resident "extension" software, for example to tag I/O requests with information about the requesting application or user so that the determination may be made based on other information provided by the host and/or entity accessing the storage device 730 (e.g., a target policy indicator provided with each write or class of writes). Other possible criteria include the time of day, the size of the incoming write operation (e.g. very large sequential writes vs. smaller random writes), file name, file type, host OS type, data type, access patterns, inter-dependent accesses to other data, etc. It is also possible that "hints" from the host could also be used, particularly relating to performance and availability requirements of the data, etc.

The system described herein may include autonomic promotion and demotion policies to facilitate optimization of performance, storage availability and power. For example, a least recently used (LRU) policy may be used to demote data blocks in order to pro-actively make room for new writes of data blocks and/or promotions of data blocks within the system. A most frequently used (MRU) policy may be used to promote data blocks that are frequently used to faster storage tiers. Predictive policies may be used to recognize that data blocks that will be needed before they are actually needed and promote the data blocks accordingly (for example, nightly batch jobs, etc.). Alternatively, the system described herein may include an application programming interface (API) that allows a hosts/users/applications to inform the storage that certain blocks should be promoted or demoted to different tiers.

Other special purpose policies may also be used. As discussed elsewhere herein, mirroring of data blocks across multiple tiers may be used. For example, for frequently used data blocks, one copy may be written to flash/SSD memory at a top storage tier and a second copy mirrored to another storage tier (e.g., tier 3 or tier 4). Another policy may include promoting and/or demoting a data block, but not deleting the data block from its pre-promoted or demoted location until the data block is modified. This policy offers advantages including when subsequently demoting the block (if unmodified), a copy may already exist on a slower storage tier and an additional copy does not need to be made (only the copy on the faster storage tier deleted). When a data block is modified, the previous copy on a different storage tier may be deleted.

Other policies may include manual or automatic pre-promotion and post-demotion policies. For example, blocks may be promoted in the background immediately before batch runs (e.g., billing runs etc.). Additionally, writes, for such processes as back-ups, may required the fastest possible write, but never (or only infrequently) read. In this case, writes may be written to a top storage tier and immediately scheduled for demotion to a lower storage tier. With MAID storage, data blocks rarely or never used may be consolidated onto individual spindles that may then be powered off, providing a reduction in power consumption for storage of data blocks infrequently accessed. Further, sequential/contiguous blocks may be coalesced and relocated in an optimization process that may include other advanced strategies, including aligning indices near to data being indexed. It is also possible to have a de-duplication policy in which nothing is deleted from storage in a de-dup tier. Data blocks in storage pools of a de-dup storage tier may be promoted to fast storage tiers as needed, but block and index/metadata in the de-dup storage may be maintained even if a data block is promoted to a faster storage tier and modified or deleted. Maintenance of de-dup storage tiers may involve "use counters" and/other mechanisms that may be used with known data cleaning processes such as garbage collection, etc.

Figure 12:
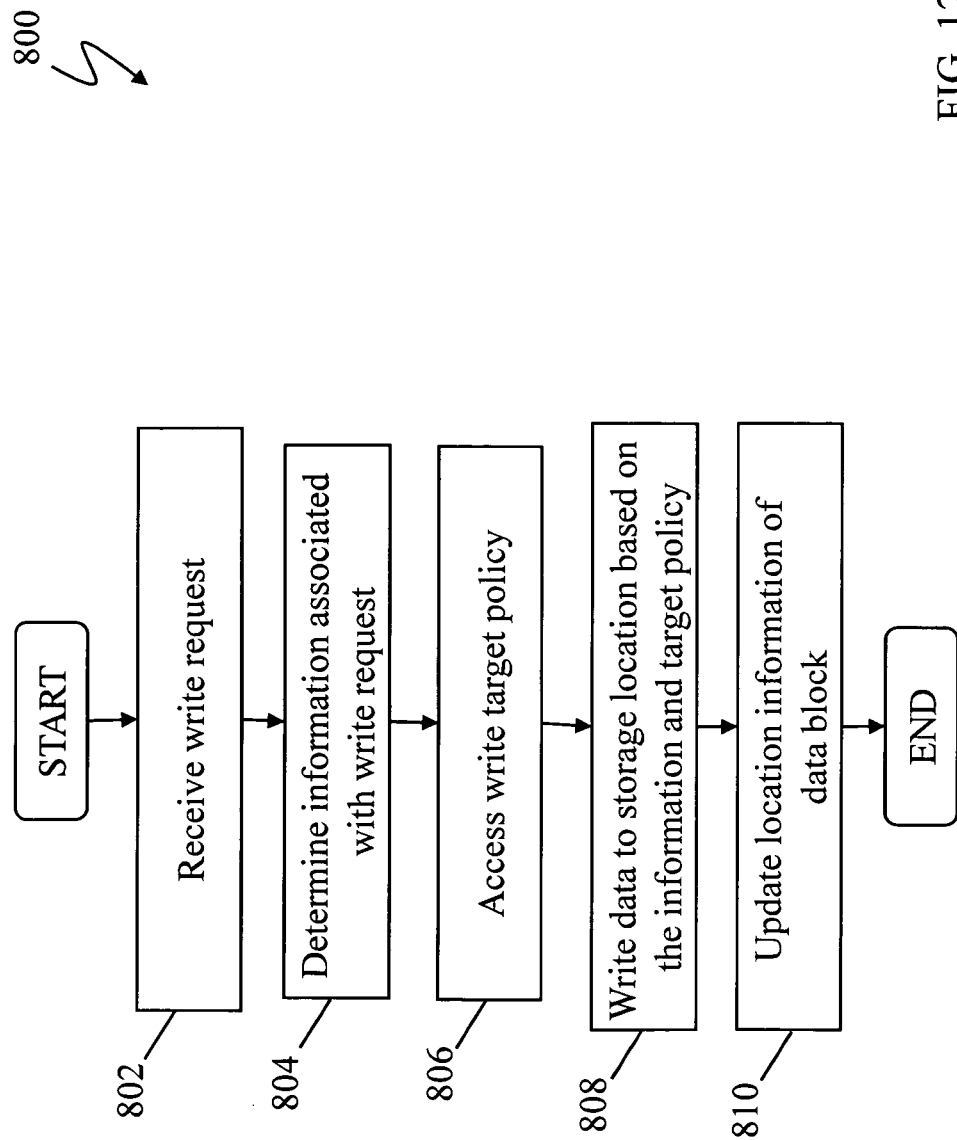
FIG. 12 is a flow diagram of processes for writing data blocks in a fine grained tiered storage system based on one or more policies according to an embodiment of the system described herein.

FIG. 12 is a flow diagram 800 of processes for writing data blocks in a fine grained tiered storage system based on one or more policies according to an embodiment of the system described herein. At a step 802, a request for a write of data is received by a thin device or other logical device associated with a storage device, as described herein.

After the step 802, processing proceeds to a step 804 where information associated with the data block is determined. For example, as further discussed elsewhere herein, the information may be the logical unit number (LUN) ID of the device from which the data is being written and/or may other information provided by the host and/or other entity accessing the storage device. After the step 804, processing proceeds to a step 806 where a write target policy is accessed. For example, as further discussed elsewhere herein, the write target policy may specify that data that is expected to be used frequently may be initially written directly to faster storage in a first storage tier whereas data that is not expected to be accessed frequently may be initially written to slower storage devices in a lower storage tier.

After the step 806, processing proceeds to a step 808 where the determined information associated with the data is processed according to the target policy and the data block is written to a storage location in the storage device according thereto. Accordingly, the data block may initially be written to a storage area (device) in a pool of storage of a storage tier corresponding to the anticipated frequency of use of the data block and/or according to other criteria. After the step 808, processing proceeds to a step 810 where information concerning the location of the data block is updated in a table of information in the thin device, as further discussed elsewhere herein. After the step 810, processing is complete.

In some cases, there may be insufficient available free space to write data to the storage tier corresponding to the storage policy at the step 808. This may be addressed in a number of ways. One possibility is to maintain the data in cache memory until space becomes available, which can occur when data is moved from the target tier as a result deletion of promotion/demotion based on storage policies. Note also that it is possible to temporarily store the data in a lower tier, and then schedule the data for promotion to the appropriate tier using any appropriate mechanism, such as setting a flag that causes the data to be promoted before any other data.

Figure 13:
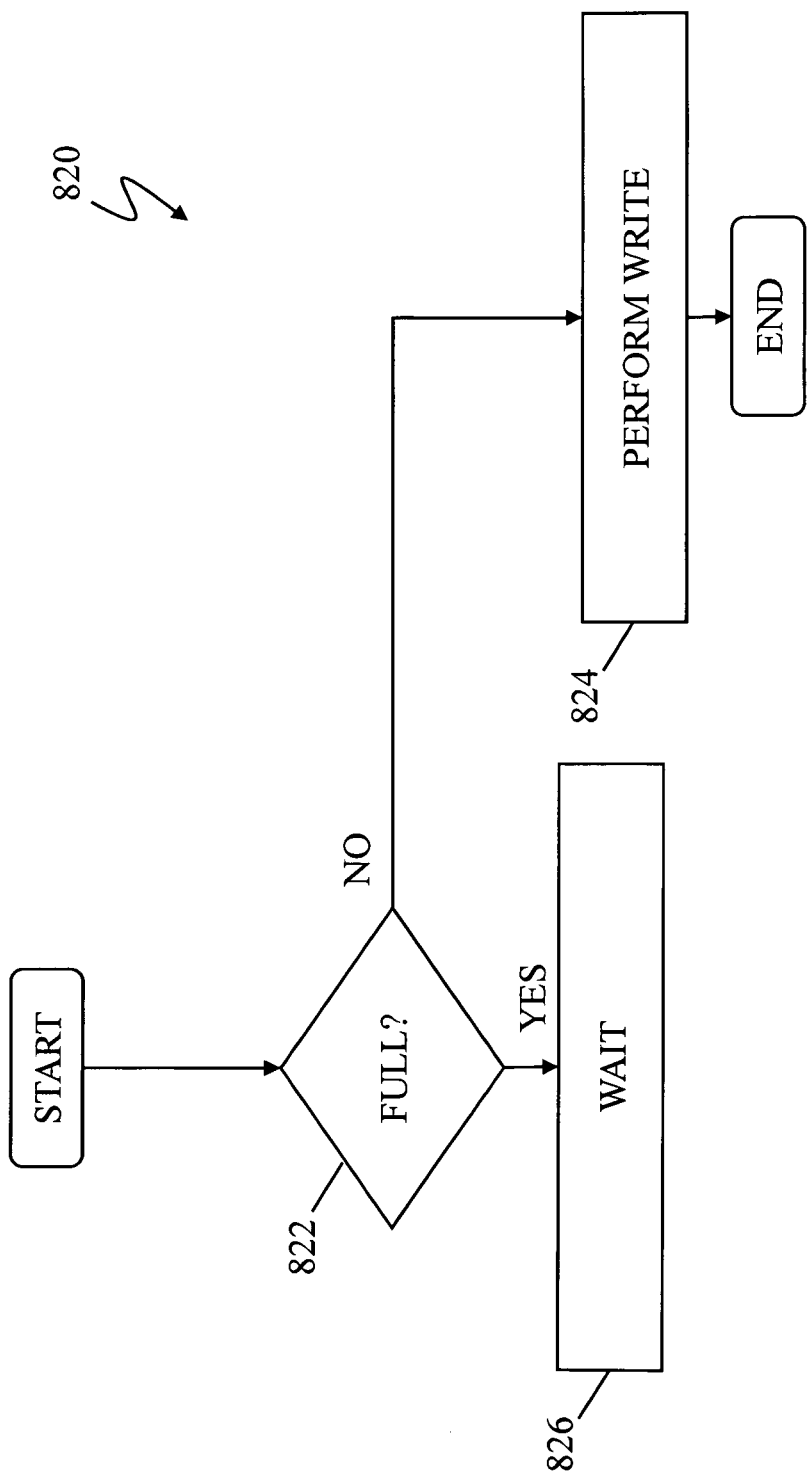
FIG. 13 is a flow diagram of processes for writing data to a particular tier according to an embodiment of the system described herein.

FIG. 13 is a flow diagram 820 illustrating steps performed in connection with writing data to a storage tier that may be full. Processing begins in the first test step 822 where it is determined if the storage tier is full. If not, then control passes from the test step 822 to a step 824 where the data is written to the storage tier. Following the step 824, processing is complete.

If it is determined at the test step 822 that the storage tier is full, then control passes from the test step 822 to a step 826 where wait processing is performed. The wait at the step 826 could be for any appropriate amount of time. Following the step 826, control passes back to the test step 822 for a new iteration.

Figure 14:
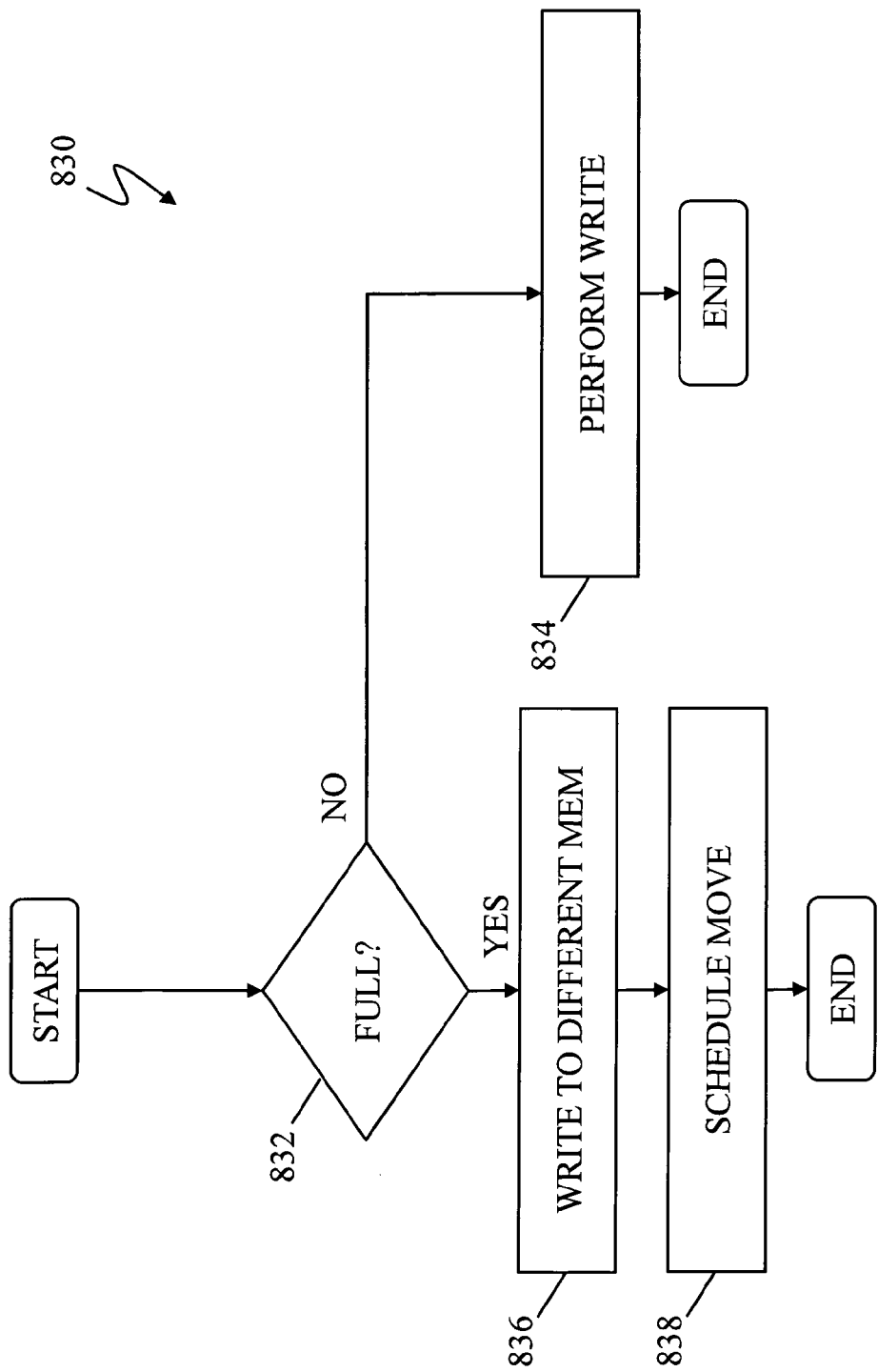
FIG. 14 is a flow diagram of processes for writing data to a particular tier according to an alternative embodiment of the system described herein.

FIG. 14 is a flow diagram 830 that illustrates an alternative embodiment for handling write operations to a storage tier that may be full. Processing begins at a first test step 832 where it is determined if the storage tier is full. If not, then control passes from the test step 832 to a step 834 where the data is written to the storage tier. Following the step 834, processing is complete.

If it is determined at the test step 832 that the storage tier is full, then control passes from the test step 832 to a step 836 where the data is written to a different storage area, such as a lower (or higher) storage tier or to global memory of the storage device (e.g., cache memory), as further discussed herein. The data may be placed in the different storage area temporarily. Following the step 836 is a step 838 where the data is scheduled to be moved to the appropriate storage area (the originally-destined storage tier). Following the step 838, processing is complete.

In an embodiment, at the step 836, the write data may be temporarily stored in a global memory, such as the global memory 46, until memory in the particular requested tier becomes available that is sufficient to handle the write request. At the step 838, scheduling for the movement of the data may include relocating data in the particular requested tier, e.g. "faster" storage tier, to a lower tier, e.g. "slower" storage tier, to make memory available for the data temporarily stored in the global memory. In another embodiment, at the step 836, data for the requested write may be immediately written to a lower tier than that requested for the write and, at the step 838, a future promotion of the data to the particular requested higher tier (originally-destined storage tier) may be scheduled. The embodiments discussed herein provide for the dynamic re-allocation and re-ordering of data to accommodate write policies, usage patterns and the like.

Figure 15:
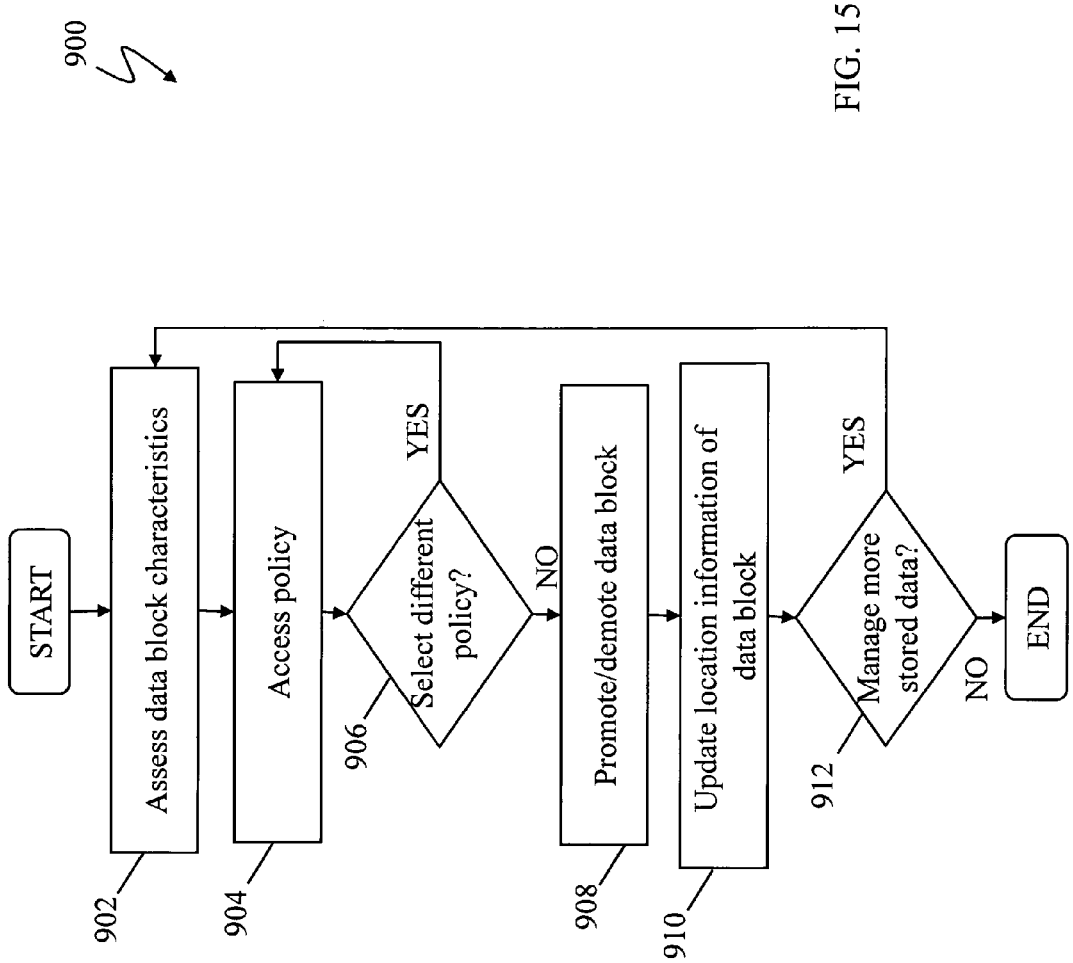
FIG. 15 is a flow diagram of processes for promoting and demoting data blocks in a fine grained tiered storage system according to an embodiment of the system described herein.

FIG. 15 is a flow diagram 900 of processes for promoting and demoting data blocks in a fine grained tiered storage system according to an embodiment of the system described herein. At a step 902, characteristics of a data block are assessed or otherwise determined. As further discussed elsewhere herein, characteristics may include access frequency of the data block, time of last access or use, information associated with particular users of the data block and/or other characteristics and statistics information. The characteristics may be assessed periodically, at a determined time, after the occurrence of a trigger event and/or based on some other criteria. After the step 902, processing proceeds to a step 904 where a policy is accessed related to promotion and/or demotion of data blocks between multiple storage tiers. Policies may be accessed automatically or manually as discussed elsewhere herein and include such policies as LRU, MFU, predictive policies and/or special purpose policies. After the step 904, processing proceeds to a test step 906 where it is determined if a different policy is to be selected. In some instances, it may be useful to be able to dynamically select the policy to be used based on characteristics of the data and/or some other criteria, such as dynamic run time conditions. For example, a first policy may be used for tier 4 data that was recently moved from tier 3 while a second policy may be used for tier 4 data that has been tier 4 data for a relatively long period of time. If a different policy is to be selected, processing proceeds back to the step 904. Otherwise, processing proceeds to a step 908.

At the step 908, data blocks are to be promoted and/or demoted according to the one or more policies. If a data block is promoted, the data block is moved to a storage area (device) in a pool of storage of a higher storage tier, for example faster storage. If a data block is to be demoted, the data block is moved to a storage area (device) in a pool of storage of a lower storage tier, for example slower storage. As further discussed elsewhere herein, in some cases, the promotion and/or demotion procedure may include moving copies of data blocks to other storage tiers and the deleting the old data blocks from their original storage location and/or copies of data blocks previously stored at the subsequent storage tiers may be used and "movement" of the data block is to make the previously-stored version of the data block become again the current, accessible data block.

After the step 908, processing proceeds to a step 910 where information concerning the location of the data block is updated in a table of information in the thin device, as further discussed elsewhere herein. After the step 910, processing proceeds to a test step 912 where it is determined whether additional stored data is to be managed according to the system described herein. If more stored data is to be managed (promoted/demoted), processing proceeds back to the step 902. Otherwise, processing is complete.

As described elsewhere herein, it may be appropriate to store data blocks in multiple locations and/or on multiple different tiers in order to implement and maintain the performance or availability policies. For example, should a policy determine that a particular block should be moved to a MAID tier, where drives are powered down for lengthy periods, a copy may also be kept on otherwise unused space in a higher tier. Should a request arrive for the block, it could thus be serviced from the copy in the higher tier instead of requiring to power up the MAID storage device. In such situations, the secondary copy might be identified as expendable. In the event a new write arrives that requires space utilized by the secondary "expendable" block, it could be overwritten with the new data and the appropriate information regarding the location of the old and new blocks updated appropriately. Further, such "expendable" blocks could be deleted on other trigger events or on a timer-based schedule.

The system described herein may be used in conjunction with garbage collection processing for memory management. For example, for data blocks that are being kept in two separate tiers, either temporarily or for longevity, it may be desirable to delete one copy to make room for more new data (e.g., when a tier is nearly full or when the pool itself is getting full). As further discussed herein, one or more lists of potential "delete" candidates may be maintained and garbage collection then becomes a process of traversing the one or more delete lists and removing redundant copies according to policy (e.g. keep the fastest, keep the slowest/cheapest, base decision on which one more recently/frequently utilized/accessed, etc.).

In an embodiment of the system described herein, a list of data sections that may be deleted (delete list) may be maintained as a linked list, such as a singly-linked list or a doubly-linked list, although other known data structures may be used. Candidates for deletion may be inserted and removed from the list using known linked list manipulation techniques or other data structure manipulation techniques. Entries in the delete list may be generated during promotion or demotion processing, as discussed elsewhere herein. For example, a data block may be promoted from a lower tier to a higher tier with the data block being copied to the higher tier and the copy of the data block on the lower tier being added to the delete list. Other techniques for generating entries in the delete list are possible.

Figure 16:
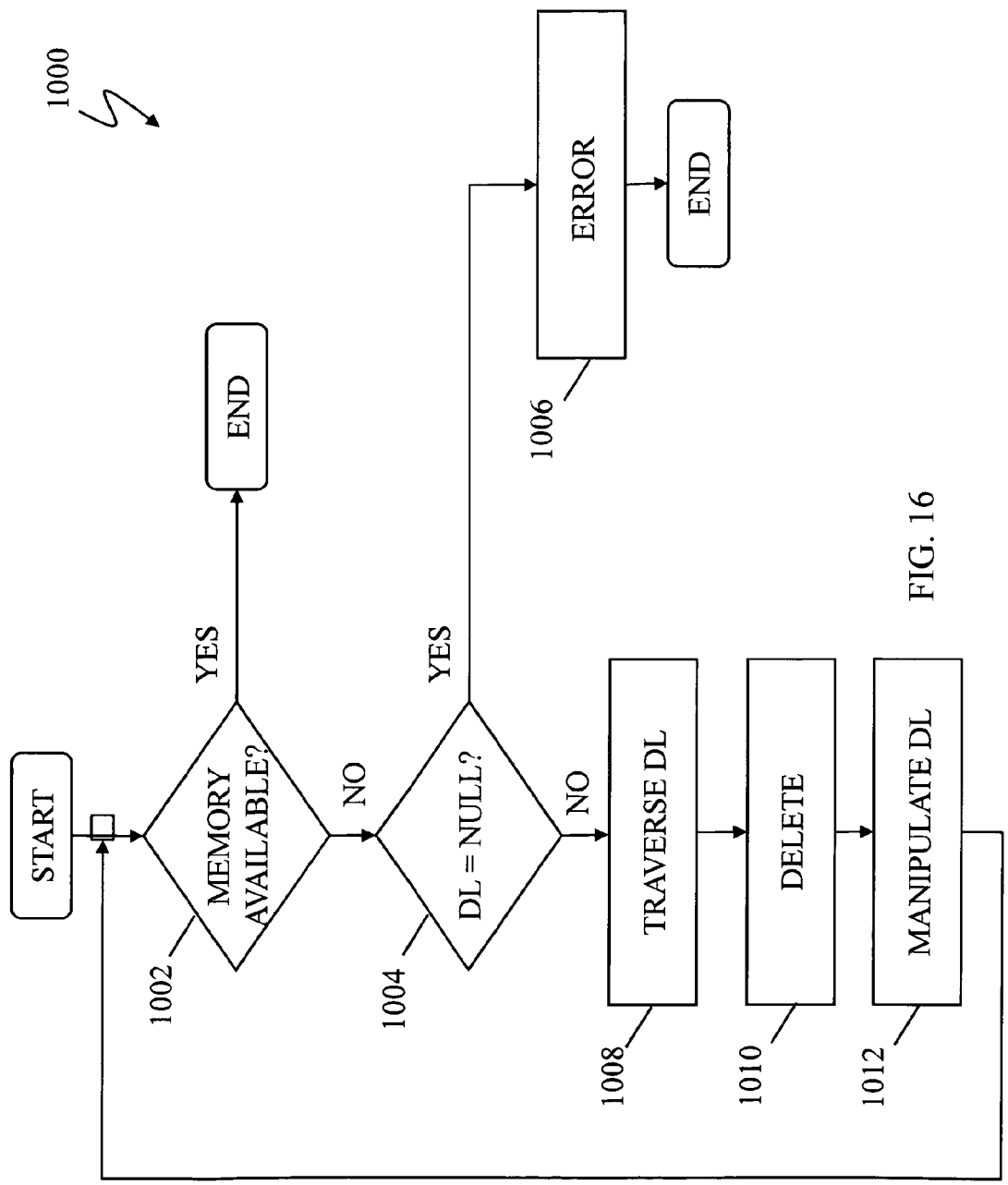
FIG. 16 is a flow diagram illustrating garbage collection processing for memory management according to an embodiment of the system described herein.

FIG. 16 is a flow diagram 1000 illustrating garbage collection processing for memory management according to an embodiment of the system described herein. At a test step 1002, it is determined whether there is sufficient memory available for a write request, for example, to a particular storage tier. If there is sufficient memory available then garbage collection is not required and processing is complete. If there is not sufficient memory available for the write request, then processing proceeds to a test step 1004 where it is determined if a delete list (DL), maintained for garbage collection as discussed herein, indicates that there are data block candidates for deletion from memory. If there are no entries in the delete list, i.e. no data block candidates for deletion from memory and the delete list is null, then processing proceeds to a step 1006 where an error is returned indicating that memory is not available for the write request. After the step 1006, processing is complete.

If the delete list contains entries indicating that there are data block candidates for deletion, then processing proceeds to step 1008 where the delete list is traversed to select a data block candidate for garbage collection, i.e. deletion. The delete list may be configured as appropriate, such as with the oldest data block candidate for deletion at the head of the linked list and the most recent data block candidate for deletion at the end. Other traversal configurations may also be used. Accordingly, for a delete list configured as noted above, the head of the list containing the oldest data block candidate for deletion may be selected for garbage collection. After the step 1008, processing may proceed to a step 1010 at which the selected data block candidate is deleted or otherwise marked for deletion. After the step 1010, processing proceeds to a step 1012 where the delete list is updated, for example using appropriate linked list manipulation techniques. After the step 1012, processing may proceed back to the test step 1002 to determine whether there is sufficient memory now available for the write request.

In various embodiments, the system described herein may allow for restore capabilities for data block candidates on the delete list. Although such data block candidates may no longer be written to, the data block candidates marked for deletion, as discussed herein, may still be read to provide restore capability of older data. The system described herein may also include processing to monitor when data block candidates on the delete list are no longer redundant copies of data. For example, data may be initially maintained as a redundant copy of data promoted to a different storage tier, but become outdated if the promoted data is changed by additional writes. In this instance, the older version of the data may be moved to the top of the delete list and/or immediately marked for deletion. The system described herein may allow for splitting of data blocks for garbage collection that includes splitting portions of files, datasets and/or databases, as further discussed elsewhere herein.

The above-noted steps, and other steps described herein, may be performed automatically by the system described herein. For example, the steps described herein may be performed periodically, at designated times, and/or after particular trigger events, such as access by a particular user to the system (log in and/or log out) and/or after assessment of space usage on the disk drives (for example, space usage on the fast disk drive). Alternatively, the steps described herein may be activated manually by a user and/or a system administrator. In an embodiment, the system described herein may include a system having at least one processor that performs any of the above-noted steps. Further, computer software, stored in a computer-readable storage medium and executable by at least one processor, may be provided according to the system described herein and including executable code for carrying out any of the steps and processes described herein.

The system described herein provides an architecture for dynamically deploying, applying, managing and/or optimizing multiple tiers of block storage technologies in a manner that is transparent and non-intrusive to standard host operating systems, file systems, databases and/or other data repository technologies. The system described herein provides for data management to relocate data to different tiers of storage that offers at least the following advantages: (a) does not require special host-resident file system replacement or extension software, (b) may operate at a granularity smaller than the file level, (c) may transparently support any host application that utilizes the data block device (file system, databases, etc.) and (d) may allow for the dynamic relocation of data blocks, including portions of files, datasets and/or databases, based on application demand and/or policy. The system described herein may be used in connection with distributed/remote replication systems, such as RDF systems, as further discussed elsewhere herein.

Figure 17:
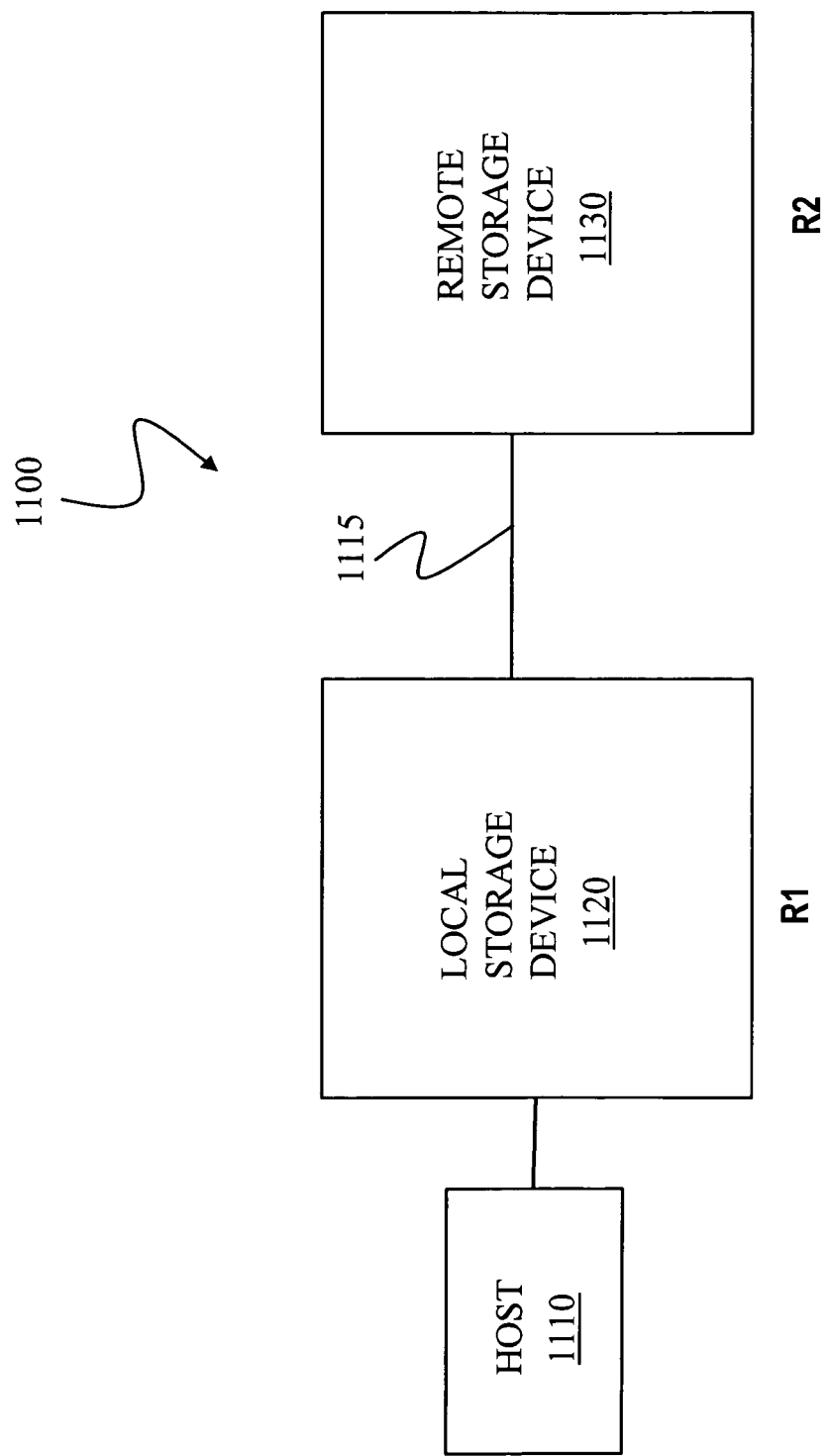
FIG. 17 is a schematic diagram showing a storage system including a primary (local) storage device coupled to a secondary (remote) storage device via an RDF link according to an embodiment of the system described herein.

FIG. 17 is a schematic diagram showing a storage system 1100 including a primary storage device 1120, as a local storage device, coupled to a secondary storage device 1130, as a remote storage device, via an RDF link 1105 according to an embodiment of the system described herein. The local storage device 1120 and the remote storage device 1130 may be each be similar to the storage device 30, having similar components therein, and/or may be different types of storage device. The local storage device 1120 and the remote storage device 1130 may operate as an RDF product for providing backup and/or mirrored copies of data, as further discussed elsewhere herein. The RDF functionality described herein may be applied so that the data for at least a portion of the disks of the local storage device 1120, like the disks 42-44 discussed in connection with the storage device 30, is copied, using RDF, to at least a portion of similar disks of the remote storage device 1130. Although identified herein as storage devices, each of the components 1120, 1130 may include storage areas of one or more storage volumes, multiple storage areas or portions and/or multiple devices at multiple local and remote sites, among other types of suitable storage configurations and platforms.

Providing an RDF mapping between portions of the local storage device 1120 and the remote storage device 1130 involves setting up a logical device on the remote storage device 1130 that is a remote mirror for a logical device on the local storage device 1120. One or more of the hosts, for example the host 1110, may read and write data from and to the logical device on the local storage device 1120. The RDF mapping causes modified data to be transferred from the local storage device 1120 to the remote storage device 1130 using RA's, like the RA's 30a-30c, along with similar RA's on the remote storage device 1130 and the RDF link 1115. In steady state operation, the logical device on the remote storage device 1130 contains data that is substantially identical to the data of the logical device on the local storage device 1120. The logical device on the local storage device 1120 that is accessed by the host 1110 may be referred to as the primary R1 device (or just "R1") while the logical device on the remote storage device 1130 that contains a copy of the data on the R1 device is called the secondary R2 device (or just "R2"). Thus, the host reads and writes data from and to the primary R1 device and RDF handles automatic copying and updating of the data from the primary R1 device to the secondary R2 device and/or from the secondary R2 device to the primary R1 device in accordance with the system described herein and using RDF transfer techniques, such as synchronous and asynchronous transfer techniques. Other embodiments using different configurations of R1 and R2 devices, and other control techniques thereof, may be used in connection with the described system, as further discussed elsewhere herein.

Distributed/remote replication systems, such as RDF and/or other types of mirroring/replication systems, may be used to enable site failover in support of disaster recovery processes and/or business continuance processes, among other support reasons. However, the mere replicating of data across the primary (R1) and secondary (R2) devices may not provide for sufficient failover capability between the R1 and R2 devices in cases where tiering at a finer granularity than the LUN, device or other volume (collectively referred to herein as a "device") is used and where subsets of a given device are stored on different tiers of storage based on, for example, application performance, request or usage patterns. When the R1 device and the R2 device both use a fully-automated storage tiering system (FAST) (e.g., a fine grained tiered storage (FGTS) system), the R2 device may not be aware of the workload seen by the primary R1 device and, accordingly, may not have the information necessary to tier the data in the same fashion as the R1 device. In such a case, the R2 device may not be able to adequately support the primary site workload in a failover because the mirrored data at the R2 device may not be as efficiently or effectively managed (e.g., storage tiered) to support the primary site workload.

One possible solution to the above-noted issue is reflect all fully-automated storage tiering block-relocation decisions made at the primary R1 device over to the secondary R2 device. However, the additional information needed for such a solution may be so large as to require be impractical in many situations. Further, such a solution may not be effective in cases where the primary R1 device and the secondary R2 device are not identically configured. Accordingly, the system described herein provides for a more practical and efficient approach to providing the R2 device with sufficient information to characterize the tiering of data stored thereon in a similar manner to the data tiering on the R1 device such that, in the event of failover, the R2 device may adequately assume the workload that was being supported by the primary R1 device.

In an embodiment, the system described herein provides for the use of a data summarization and/or characterization approach to synchronize data layouts and resource utilizations at one or more remote replica sites with the workload and tiering decisions being made at the primary site. Raw data access information about the workload of the primary R1 device is collected at the R1 device. The raw data access information may include, for example, data access and/or usage information about the data stored on the R1 device, including information collected about each access and/or use of data, among other access and/or usage characteristics, as further discussed elsewhere herein. The raw data access information may be characterized, condensed and/or relevant information may be encapsulated therefrom about the workload of the primary R1 device. The characterized data access information may include statistical information concerning access rates of data, frequency of use of data, a time of last use of data, source/requestor information of the data, and/or other statistics of the raw data access information over a period of time. In this way, the characterized data access information of the workload at the primary R1 device may be sent periodically to the secondary R2 device, but less frequently, and with less total information, than for every block-relocation decision made at the primary R1 device.

The frequency with which the characterized data access information may be collected and transmitted to the R2 device may be variably controlled and/or determined according to the specific requirements of a particular system or industry. Specifically, raw data access information may be collected and characterized data access information generated and transmitted according to the access rates of the data over time, for example, different frequencies of collection, generation and transmission based on different access rates of the data over minutes, hours, days, etc. Other mechanisms may be used for determining the frequency of collection of raw data access information and the generation and transmission of the characterized data access information in accordance with the system described herein.

Figure 18:
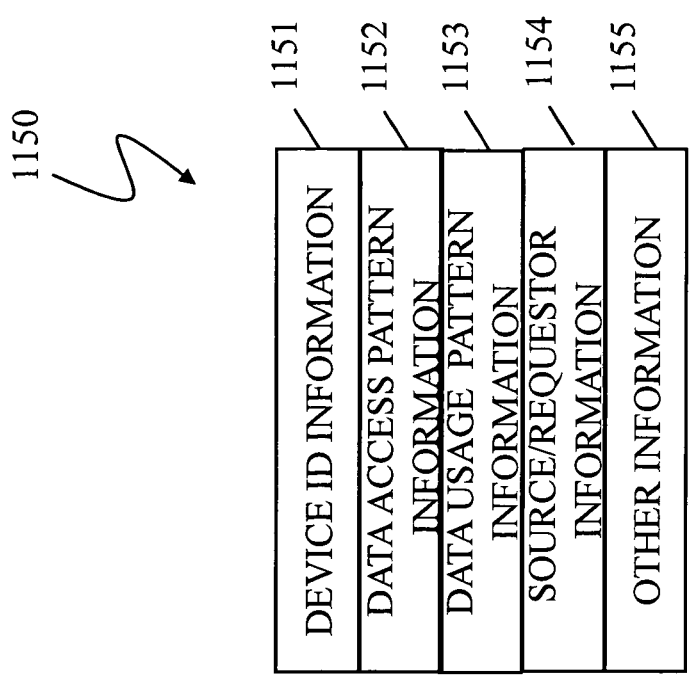
FIG. 18 is a schematic diagram showing a characterized data access information element generated according to an embodiment of the system described herein.

FIG. 18 is a schematic illustration showing a characterized data access information element 1150 that may be generated and transmitted from the primary R1 storage device 1120 to the secondary R2 storage device 1130 in accordance with an embodiment of the system described herein. The characterized data access information element 1150 may be the result of characterizing and/or otherwise condensing raw data access information collected concerning data access workload supported by the primary R1 storage device. The characterized data access information may be smaller in size and/or contain less information than the raw data access information. The element 1150 may include a plurality of entries 1151-1155.

In an embodiment, the entry 1151 may include device identification information identifying the device that is the subject of the characterized data access information. The entries 1152-1154 may include different types of characterized data access information. For example, the entry 1152 may include data access pattern information concerning data access rate information, time of last access, and/or other request pattern information that statistically characterizes the data access workload supported on the primary R1 storage device 1120. The entry 1153 may include data usage pattern information, including, for example, information with respect to application performance and usage requirements and/or other data usage pattern information that statistically characterizes data usage workload supported on the primary R1 device 1120. The entry 1154 may include source/requestor information that identifies the requesting source of the information. For example, data for use by a particular device, such as an ATM, may indicate higher storage tiering requirements for the data, regardless of actual access rate of the data, and/or a request by a particular individual may indicate that storage of the data should be on a higher tier of storage than is normally required. Other suitable source/requestor information may be used in connection with the system described herein. The entry 1154 may contain other information, for example, the time since the last characterized data access information was sent. Additional information may be contained within the characterized data access information element 1150 concerning statistics about data access information of the workload supported on the primary storage device 1120 for use in connection with the system described herein and/or only certain of the above-noted entries may be included in the characterized data access information element 1150. Of course, the data access information element 1150 may contain different information than that illustrated in FIG. 18.

The system described herein provides for minimizing the amount of raw data access information that has to be transmitted from the primary R1 device to the secondary R2 device. The characterized data access information transmitted to the R2 device allows the R2 device to operate according to a fully-automated storage tiering system that is independent from the storage tiering system of the R1 device but sufficient to handle the workload of the primary site in the event of failover. Specifically, each remote storage device may make its own independent decisions on how best to utilize the available resources to match the performance requirements currently being supported by the primary site. It should be noted then that, with the characterized data access information, the R2 device may utilize the same or different tiered storage configurations than the primary R1 device, but in a way that is sufficient to handle the workload that the R1 device is supporting.

Figure 19A:
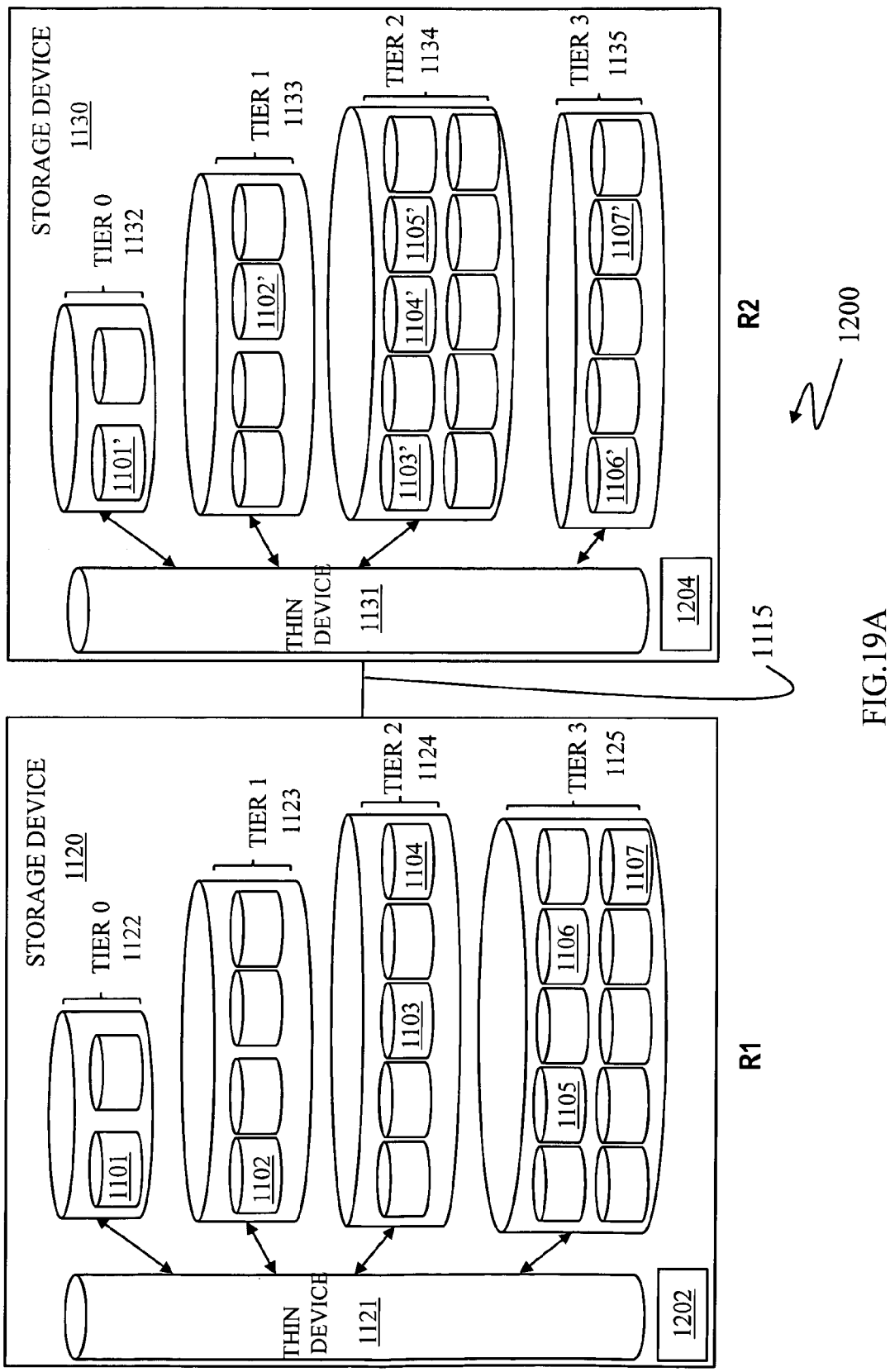
FIG. 19A is a schematic illustration showing a storage system including primary and secondary storage devices each having stored data managed thereon and that are not identically configured according to an embodiment of the system described herein.

FIG. 19A is a schematic diagram of a storage system 1200 with the multiple storage devices 1120, 1130 connected via the link 1115 and communicating as primary R1 and secondary R2 devices as part of a distributed/remote data replication system according to an embodiment of the system described herein. It should be noted that, as discussed elsewhere herein and as illustrated in the figure, the storage devices 1120, 1130 may not be identical and may have different configurations and/or capabilities. The storage device 1120 is shown including a thin device 1121 coupled to multiple storage tiers 1122 (tier 0), 1123 (tier 1), 1124 (tier 2), 1125 (tier 3) having different storage features and/or characteristics. The thin device 1121 may map to different storage areas (or devices) across the multiple storage tiers, as further discussed elsewhere herein. For example, in the illustrated embodiment, and as further discussed elsewhere herein, the thin device 1121 may map blocks of data to storage areas (or devices) such as a storage area 1101 in the pool of storage of the top storage tier 1122 (tier 0), a storage area 1102 in the pool of storage of the next storage tier 1123 (tier 1), storage areas 1103, 1104 in the pool of storage of the next storage tier 1124 (tier 2), and storage areas 1105, 1106 and 1107 in the pool of storage of the next storage tier 1125 (tier 3).

The storage device 1120 may further include a data access information collector/controller 1202 that may monitor and collect data access information concerning the data workload at the storage device 1120 acting as the primary R1 device. It should be noted that, in various embodiments, the data access information collector/controller 1202 may be a software module stored on the storage device 1120 and/or may be located externally to the storage device 1120 and coupled thereto, among other suitable configurations. The data access information collector/controller 1202 may generate, from the raw collected data access information, the characterized data access information including characterizing statistics of data access, as further discussed elsewhere herein. The characterized data access information may be smaller in size and/or contain less information than the raw collected data access information. The characterized data access information may be transmitted to the storage device 1130 acting as the secondary R2 device for processing thereon, as further discussed elsewhere herein.

The storage device 1130 is shown including a thin device 1131 coupled to multiple storage tiers 1132 (tier 0), 1133 (tier 1), 1134 (tier 2), 1135 (tier 3) having different storage features and characteristics, as further discussed elsewhere herein. The thin device 1131 may map to different storage areas (or devices) across the multiple tiers. The storage device 1130 acts the secondary R2 device by providing data replication and/or mirroring functionality. Data areas 1101', 1102', 1103', 1104', 1105', 1106', 1107' in the storage device 1130 contain data corresponding to the data contained within the data areas 1101-1107 of the storage device 1120. The corresponding data of the data areas 1101'-1107' is associated with the data stored in the data areas 1101-1107 of the storage device 1120 and, for example, may be a exact copy of the data stored in the data areas 1101-1107 of the storage device 1120 and/or may be a somewhat earlier version of the data stored in the data areas 1101-1107 according to the frequency of data replication of the RDF system.

The data in the data areas 1101'-1107' may be subject to data tiering according to the characterized data access information received by the storage device 1130 concerning the primary workload at the primary R1 device (the storage device 1120). The storage device 1130 may include a receiver/controller 1204 that receives the characterized data access information about the primary R1 device and controls the use of the characterized data access information for management of the replicated data on the storage device 1130 as the secondary R2 device. It should be noted that, in various embodiments, the receiver/controller 1204 may be a software module stored on the storage device 1130 and/or may be located externally to the storage device 1130 and coupled thereto, among other suitable configurations.

The storage device 1130 is shown as having a different storage configuration than the storage device 1120. Further, the result of data tiering the replicated data from the storage device 1120 based on the characterized data access information is illustrated as not being identical to the data tiering on the storage device 1120. For example, the data of data area 1105 on the storage device 1120 is shown as being stored in the storage tier 1125 (tier 3) of the storage device 1120 (primary R1 device); however, the data of data area 1105' on the storage device 1130 corresponding to the data of data area 1105 is shown as being stored in the storage tier 1134 (tier 2) of the storage device 1130 (secondary R2 device). That is, the data tiering on the storage device 1130 using the characterized data access information has resulted in the storing of the data of data area 1105' of the storage device 1130 on a different storage tier (storage tier 1134) than the equivalent storage tier (storage tier 1125) on the storage device 1120 in accordance with the storage functionality of storage device 1130. It is noted, however, that in accordance with the system described herein, the data tiering on the storage device 1130 (the secondary R2 device) is such that the storage device 1130 is capable of quickly assuming the primary workload that is currently being supported by the storage device 1120 (the primary R1 device). Accordingly, the characterized data access information transmitted to the storage device 1130 allows the storage device 1130 to make its own independent decisions on how best to utilize its available resources to match the performance requirements currently being supported by the storage device 1120.

Figure 19B:
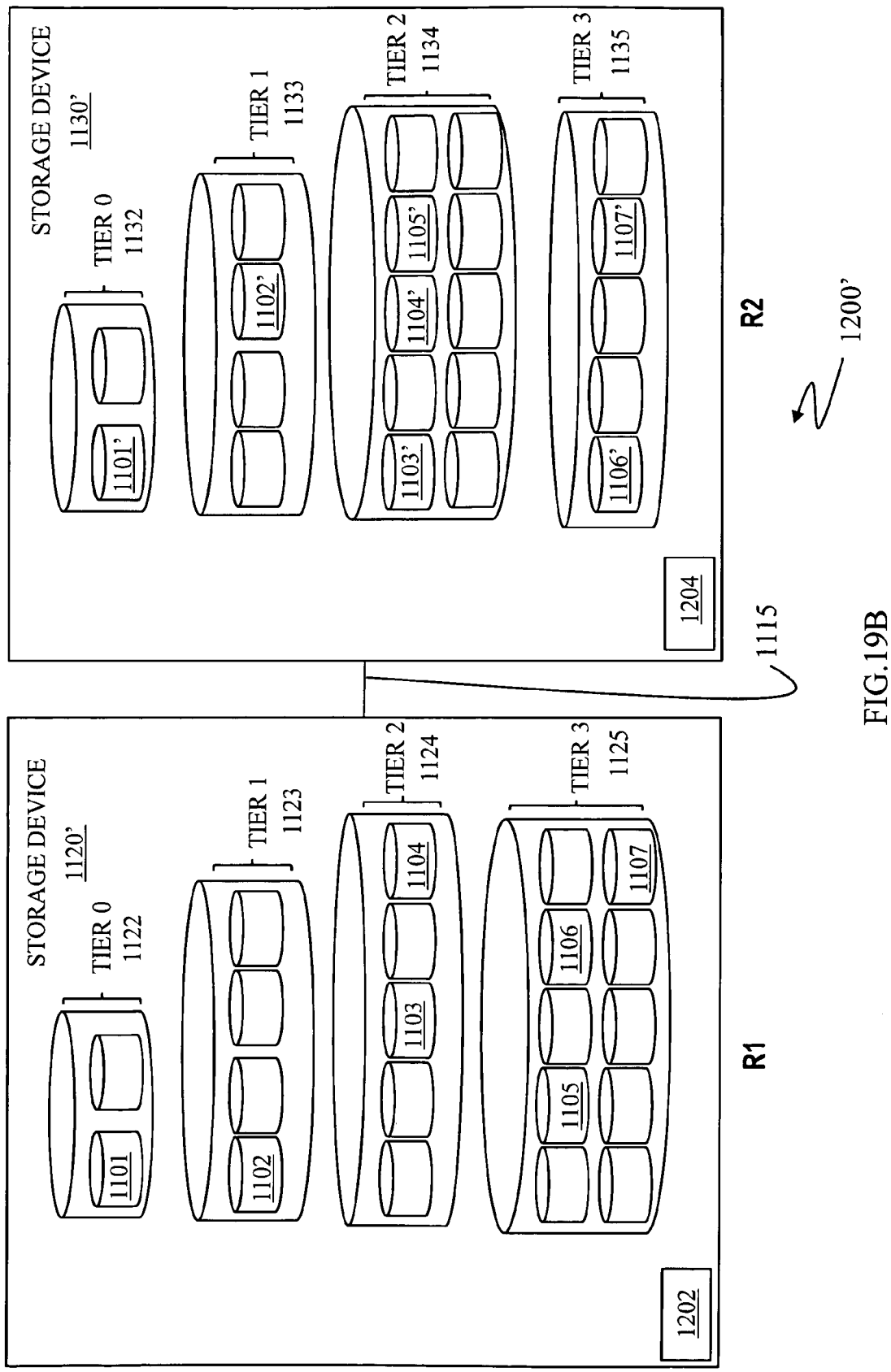
FIG. 19B is a schematic illustration showing a storage system including primary and secondary storage devices each having stored data managed thereon and that are not identically configured according to an alternative embodiment of the system described herein.

FIG. 19B is a schematic diagram of an alternative embodiment of a storage system 1200' with the multiple storage devices 1120', 1130' connected via the link 1115 and communicating as primary R1 and secondary R2 devices as part of a distributed/remote data replication system according to an embodiment of the system described herein. The storage devices 1120', 1130; do not include and thin devices, but do use a data storage tiering scheme like that of the storage system 1200, discussed above. Thus, the storage device 1120' may include the data access information collector/controller 1202 and the storage device 1130 may include the receiver/controller 1204, discussed above. The storage device 1130' may have a different storage configuration than the storage device 1120'. Further, the result of data tiering the replicated data from the storage device 1120' based on the characterized data access information is illustrated as not being identical to the data tiering on the storage device 1120'. Just as with the storage devices 1120, 1130, discussed above, the characterized data access information transmitted to the storage device 1130' allows the storage device 1130' to make its own independent decisions on how best to utilize its available resources to match the performance requirements currently being supported by the storage device 1120'.

FIG. 20 is a flow diagram 1300 showing a process for generating and transmitting characterized data access information from a primary R1 device to a secondary R2 device according to an embodiment of the system described herein. At a step 1302, raw data access information for the primary R1 device workload is collected. As further discussed elsewhere herein, the raw data access information may be collected according to the particular use and/or access of data on the R1 device and may be collected based on application performance, request or usage patterns, and/or other characteristics at the primary site. Data access information may include information about data reads and writes. After the step 1302, processing proceeds to a step 1304 where the collected raw data access information is characterized, and/or otherwise condensed and relevant information therefrom encapsulated, to generate characterized data access information with statistics about the data access workload on the R1 device. The statistics of the characterized data access information may be tabulated information generated from the data access information over a determined period of time or based on another metric that statistically quantifies data access patterns and/or other characteristics at the primary R1 device, as further discussed elsewhere herein.

After the step 1304, processing proceeds a step 1306 where the characterized data access information is transmitted to the secondary R2 device that may be located remotely from the R1 device. It may be noted that transfer of the characterized data access information may be performed independently from or concurrently with the data replication processing (e.g. RDF processing) that occurs between the R1 and R2 devices. After the step 1306, processing proceeds to a step 1308 where the secondary R2 device receives the characterized data access information. After the step 1308, processing proceeds to a step 1310 where the secondary R2 device manages the data on the secondary R2 device by applying an ILM algorithm, as further discussed elsewhere herein, to storage tier data on the secondary R2 device according to the characterized data access information and based on the storage resources and/or capabilities of the secondary R2 device. Accordingly, the storage tiering on the secondary R2 device may be sufficient to handle the workload requirements that are being supported on the primary R1 device. After step 1310, processing is complete.

FIG. 21 is a flow diagram 1400 showing a process of failover from a primary R1 device to a secondary R2 device that has undergone fully-automated storage tiering processing, as further discussed elsewhere herein, based on the characterized data access information received about the data access workload on the primary R1 device according to an embodiment of the system described herein. At a step 1402, it is determined that primary workload processing is to failover from the R1 device to the secondary R2 device. For example, failover from the R1 device to the R2 device may occur in accordance with disaster recovery processing and/or business continuance processing, among other reasons. After the step 1402, processing proceeds to a step 1404 where failover from the R1 device to the R2 device occurs. After the step 1404, processing proceeds to a step 1406 where the R2 device assumes workload processing as the primary device. According to the system described herein, the R2 device may assume workload processing as the primary device almost immediately because data tiering has occurred on the R2 device that reflects the workload processing previously supported on the R1 device on the basis of the characterized data access information periodically provided to the R2 device. After step 1406, processing is complete.

The system described herein may be used in connection with multiple types of distributed/remote data replication systems and techniques.

Figure 22:
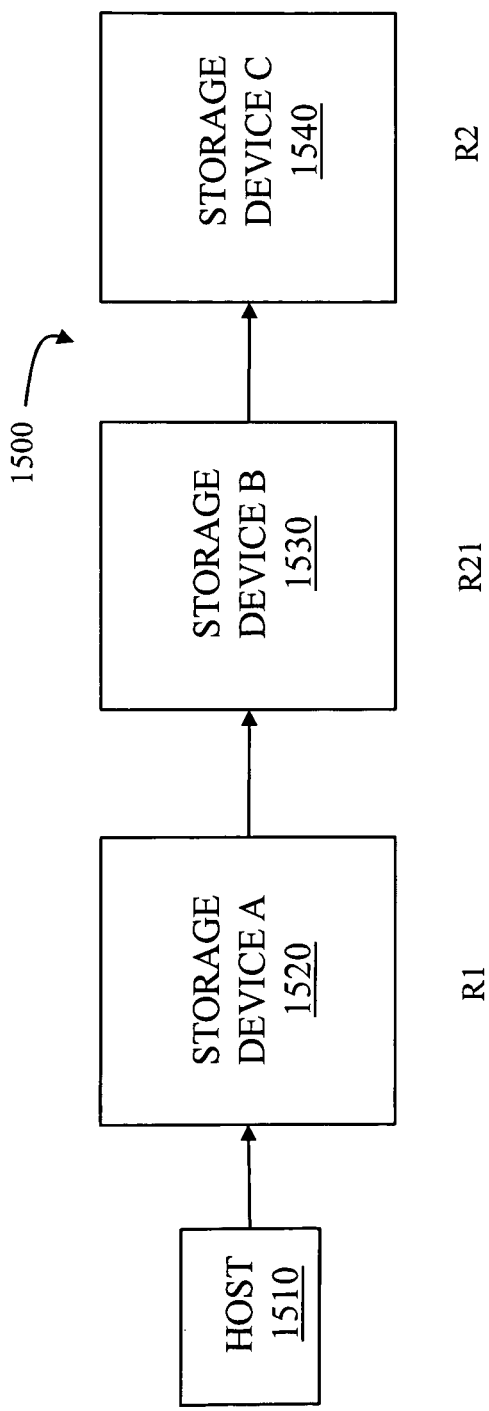
FIG. 22 is a schematic illustration showing an embodiment of a distributed/remote replication system having a host coupled to a plurality of storage devices that may operate in connection with the system described herein.

FIG. 22 is a schematic illustration showing an embodiment of a distributed/remote replication system 1500 having a host 1510 coupled to a plurality of storage devices 1520, 1530, 1540 that may operate in connection with the system described herein. The storage device 1520 may be referred to as "storage device A" or the local storage device, the storage device 1530 may be referred to as "storage device B" or the intermediate storage device, and the storage device 1540 may be referred to as "storage device C" or the remote storage device. The storage devices 1520-1540 may be like the storage devices described herein and/or may be any other appropriate devices capable of providing the functionality described herein.

The host 1510 may be coupled to the storage device 1520, which has at least one logical storage device (R1) that the host 1510 accesses for reading and writing data. The local storage device 1520 may be coupled to the intermediate storage device 1530. The intermediate storage device 1530 includes at least one logical storage device (R21) that may have an RDF relationship with the at least one logical storage device (R1) of the local storage device 1520 such that data written by the host 1510 to the logical storage device (R1) of the local storage device 1520 is propagated to the logical storage device (R21) of the intermediate storage device 1430 in a manner that is essentially transparent to the host 1510, consistent with normal RDF operation discussed elsewhere herein. The logical storage device (R1) that receives writes from the host 1510 is a primary logical storage device while the logical storage device (R21) that receives copies of data written to the primary logical storage device is a secondary logical storage device.

The intermediate storage device 1530 may be coupled to the remote storage device 1540, which has at least one logical storage device (R2) that has an RDF relationship with the at least one logical storage device (R21) of the intermediate storage device 1530 such that data written to the logical storage device (R21) of the intermediate storage device 1530 is propagated to the logical storage device (R2) of the remote storage device 1540. Data is written to the logical storage device (R21) by virtue of being the secondary device in the R1/R21 RDF relationship between the storage devices 1520, 1530. Thus, the logical storage device (R21) acts as a secondary logical storage device with respect to the primary logical storage device (R1) of the local storage device 1520, but acts as a primary logical storage device with respect to the secondary logical storage device (R2) of the remote storage device 1540.

In accordance with the system described herein, the characterized data access information generated for the primary workload at the local storage device 1520 (R1) may be transmitted to the intermediate storage device 1530 (R21) for use in data tiering thereon. Further, additional characterized data access information may be generated based on the workload at the intermediate storage device 1530 (R21) and combined with the characterized data access information generated for the primary workload at the local storage device 1520 (R1) and/or otherwise provided for transmission to the remote storage device 1540 (R2) for use in data tiering thereon in accordance with the system described herein. Other system configurations operating in accordance with the features described in this figure may also be used in connection with the system described herein.

Figure 23:
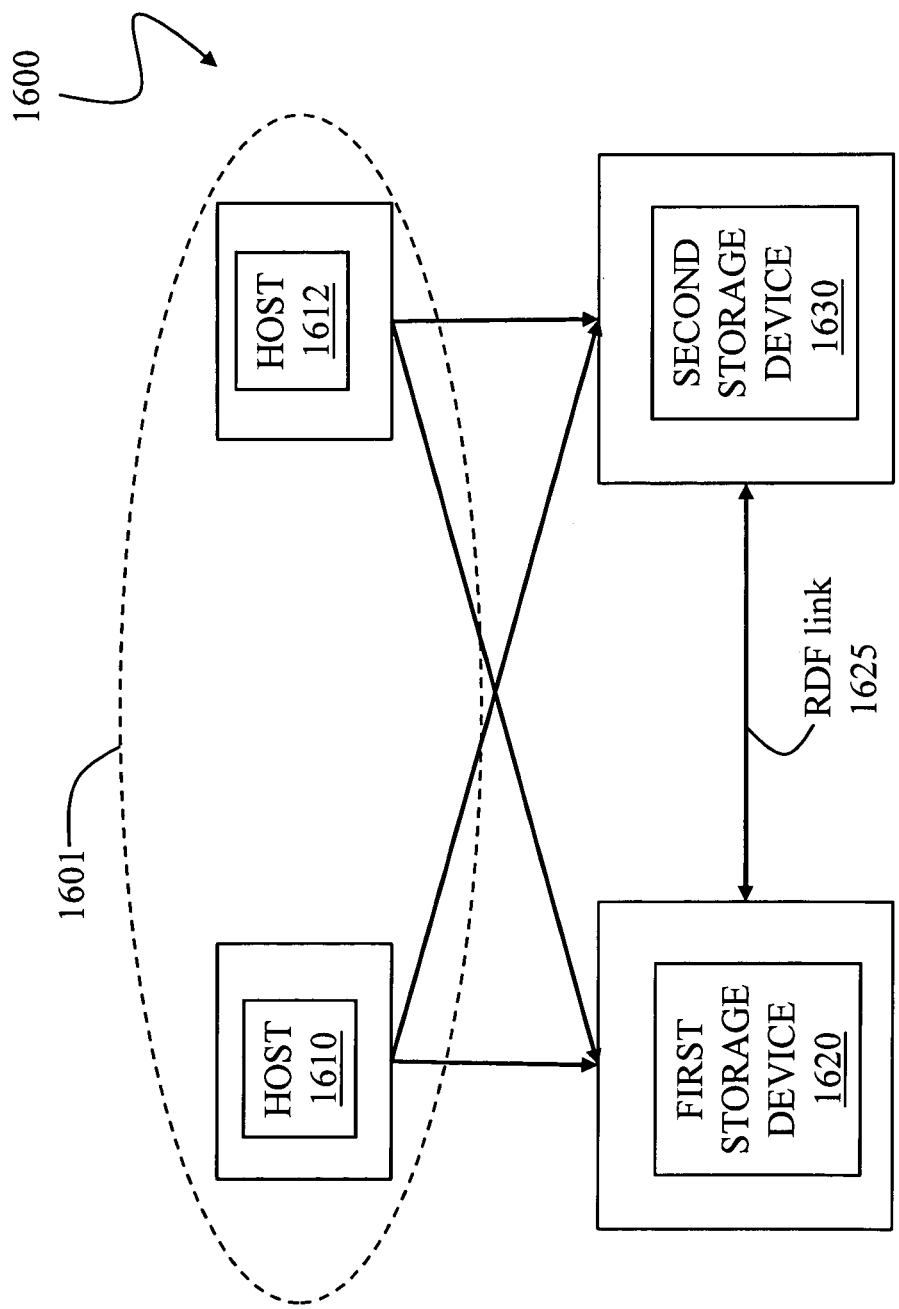
FIG. 23 a schematic illustration shown an embodiment of a distributed/remote replication system involving multiple hosts that may operate in connection with the system described herein.

FIG. 23 is a schematic illustration showing an embodiment of a distributed/remote replication system 1600 involving multiple hosts that may operate in connection with the system described herein. The system 1600 provides for remote mirroring where multiple storage volumes, e.g., a first storage device 1620 and a second storage device 1630, may each act like primary R1 devices and secondary R2 devices at the same time. A plurality of hosts 1610, 1612 may be coupled to the first storage device 1620 and the second storage device 1630 to conduct read and write operations from and to the storage devices 1620, 1630, for example to the nearest device. In various embodiments, the plurality of hosts 1610, 1612 may be coupled to the storage devices 1620, 1630 directly and/or via a network, such as the Internet, an intranet and/or other suitable network The hosts 1610, 1612 may be part of a cluster 1601, which may be formed by a group of hosts and/or applications connected together, for example, via a local area network and/or other network. As illustrated, in accordance with the system described herein, the first storage device 1620 and the second storage device 1630 may be connected via a link 1625, such as an RDF link, for providing remote mirroring capabilities between the storage devices 1620, 1630.

In an embodiment, each of the storage devices 1620, 1630 may be treated like a primary R1 device by one or more of the hosts 1610, 1612. For example, the host 1610 may treat the first storage device 1620 as a primary storage device (R1) and the second storage device 1630 as a secondary storage device (R2) while the host 1612 may treat the second storage device 1630 as a primary storage device (R1) and the first storage device 1620 as a secondary storage device (R2). Further, each of the hosts 1610, 1612 may also be coupled to both the first storage device 1620 and the second storage device 1630 to provide automatic failover in the case of failure of one or more of the storage devices 1620, 1630, or a link thereto, as further discussed elsewhere herein. In the case of failover, each of the hosts 1610, 1612 may continue to work with the non-failing device with no interruption in service. Other system configurations operating in accordance with the features described in this figure may also be used in connection with the system described herein.

In accordance with the system described herein, characterized data access information may be generated based on the workload at the first storage device 1620 in connection with the host 1610 and transmitted to the second storage device 1630 for use in data tiering thereon. Additionally, characterized data access information may be generated based on the workload at the second storage device 1630 in connection with the host 1612 and transmitted to the first storage device 1620 for use in data tiering thereon in accordance with the system described herein.

The embodiments described herein may be combined together in appropriate combinations in accordance with the system described herein. The system described herein may include a computer having at least one processor that performs any of the above-noted steps. The system may further include a display and/or other computer components for providing a suitable interface with other computers and/or with a user. A computer-readable storage medium may be provided storing executable code that is executable by least one processor for carrying out any of the steps and processes described herein. The system may include the computer-readable storage medium having the executable code stored thereon. Computer-readable storage mediums may include RAM, ROM, hard disks, compact disks, portable flash drives and/or other types of tangible memory or media that may be read by a computer.

Other embodiments of the invention will be apparent to those skilled in the art from a consideration of the specification or practice of the invention disclosed herein. It is intended that the specification and examples be considered as exemplary only, with the true scope and spirit of the invention being indicated by the following claims.

What is claimed is:

1. A method for managing data among a plurality of storage devices, comprising:
    collecting raw data access information about data stored on a first storage device of the plurality of storage devices, wherein the raw data access information corresponds to a workload of the first storage device, the workload including read and write accesses of the data stored on the first storage device, and wherein the raw data access information includes a number of the read and write accesses of the workload;
    characterizing the raw data access information to generate characterized data access information, wherein the characterized data access information contains less information than the raw data access information, and wherein the characterized data access information identifies at least one access characteristic of the data stored on the first storage device, wherein the at least one access characteristic of the data stored on the first storage device includes information concerning at least one of: an access rate of the data on the first storage device or a frequency of use of the data on the first storage device;
    transmitting the characterized data access information to a second storage device of the plurality of storage devices, wherein the generating and transmitting of the characterized data access information is performed independently from data replication processing between the first storage device and the second storage device; and
    managing data stored on the second storage device according to the characterized data access information, wherein the data stored on the second storage device corresponds to the data stored on the first storage device, wherein the data stored on the second storage device is present on the second storage device prior to receipt of the characterized data access information by the second storage device, wherein the characterized data access information causes the data stored on the second storage device to be stored in a different storage configuration than a storage configuration prior to receipt of the characterized data access information, wherein the different storage configuration includes storing the data among a plurality of storage tiers of the second storage device, each of the plurality of storage tiers having different data access characteristics, wherein particular data is stored on a particular storage tier based on the characterized data access information.

2. The method according claim 1, wherein management of data stored on the second storage device is performed independently of management of data stored on the first storage device.

3. The method according to claim 1, wherein the data stored on the second storage device is managed to match performance requirements being supported by the first storage device.

4. The method according to claim 1, wherein management of data stored on the second storage device is performed independently of management of data stored on the first storage device, and wherein the data stored on the second storage device is managed to match performance requirements being supported by the first storage device.

5. The method according to claim 1, wherein a first storage tier of the plurality of storage tiers includes memory that is accessible relatively faster than memory of a second storage tier of the plurality of storage tiers.

6. The method according to claim 1, wherein the data stored on the second storage device is a copy of the data stored on the first storage device.

7. The method according to claim 1, wherein the characterized data access information includes information concerning at least one of: a time of last use of the data or source/requestor information of the data.

8. The method according to claim 1, wherein the characterized data access information is transmitted periodically to the second data storage device.

9. A non-transitory computer-readable medium having executable code stored thereon that is executable by at least one processor, the computer-readable medium comprising:
   executable code that collects raw data access information about data stored on a first storage device of a plurality of storage devices, wherein the raw data access information corresponds to a workload of the first storage device, the workload including read and write accesses of the data stored on the first storage device, and wherein the raw data access information includes a number of the read and write accesses of the workload;
   executable code that characterizes the raw data access information to generate characterized data access information, wherein the characterized data access information contains less information than the raw data access information, and wherein the characterized data access information identifies at least one access characteristic of the data stored on the first storage device, wherein the at least one access characteristic of the data stored on the first storage device includes information concerning at least one of: an access rate of the data on the first storage device or a frequency of use of the data on the first storage device;
   executable code that transmits the characterized data access information to a second storage device of the plurality of storage devices, wherein the generating and transmitting of the characterized data access information is performed independently from data replication processing between the first storage device and the second storage device; and
   executable code that manages data stored on the second storage device according to the characterized data access information, wherein the data stored on the second storage device corresponds to the data stored on the first storage device, wherein the data stored on the second storage device is present on the second storage device prior to receipt of the characterized data access information by the second storage device, wherein the characterized data access information causes the data stored on the second storage device to be stored in a different storage configuration than a storage configuration prior to receipt of the characterized data access information, wherein the different storage configuration includes storing the data among a plurality of storage tiers of the second storage device, each of the plurality of storage tiers having different data access characteristics, wherein particular data is stored on a particular storage tier based on the characterized data access information.

10. The non-transitory computer-readable medium according claim 9, wherein management of data stored on the second storage device is performed independently of management of data stored on the first storage device.

11. The non-transitory computer-readable medium according to claim 9, wherein the data stored on the second storage device is managed to match performance requirements being supported by the first storage device.

12. The non-transitory computer-readable medium according to claim 9, wherein a first storage tier of the plurality of storage tiers includes memory that is accessible relatively faster than memory of a second storage tier of the plurality of storage tiers.

13. The non-transitory computer-readable medium according to claim 9, wherein the data stored on the second storage device is a copy of the data stored on the first storage device.

14. The non-transitory computer-readable medium according to claim 9, wherein the characterized data access information includes information concerning at least one of: a time of last use of the data or source/requestor information of the data.

15. The non-transitory computer-readable medium according to claim 9, wherein the characterized data access information is transmitted periodically to the second data storage device.

16. A computer storage system, comprising:
   a plurality of interconnected directors, wherein at least some of the directors handle reading and writing data for the computer storage system;
   a plurality of storage devices, coupled to at least some of the directors, that store data for the computer storage system; and
   a non-transitory computer-readable medium of at least one of the directors that stores executable code, the computer-readable medium including:
      executable code that collects raw data access information about data stored on a first storage device of the plurality of storage devices, wherein the raw data access information corresponds to a workload of the first storage device, the workload including read and write accesses of the data stored on the first storage device, and wherein the raw data access information includes a number of the read and write accesses of the workload;
      executable code that characterizes the raw data access information to generate characterized data access information, wherein the characterized data access information contains less information than the raw data access information, and wherein the characterized data access information identifies at least one access characteristic of the data stored on the first storage device, wherein the at least one access characteristic of the data stored on the first storage device includes information concerning at least one of: an access rate of the data on the first storage device or a frequency of use of the data on the first storage device;

executable code that transmits the characterized data access information to a second storage device of the plurality of storage devices, wherein the generating and transmitting of the characterized data access information is performed independently replication processing between the first storage device and the second storage device; and executable code that manages data stored on the second storage device according to the characterized data access information, wherein the data stored on the second storage device is present on the second storage device prior to receipt of the characterized data access information by the second storage device, wherein the characterized data access information causes the data stored on the second storage device to be stored in a different storage configuration than a storage configuration prior to receipt of the characterized data access information, wherein the different storage configuration includes storing the data among a plurality of storage tiers of the second storage device, each of the plurality of storage tiers having different data access characteristics, wherein particular data is stored on a particular storage tier based on the characterized data access information.

17. The method according to claim 1, wherein the data is stored in the different storage configuration in memory of the second storage device such that relative performance characteristics of the memory storing the data on the second storage device correspond to relative performance characteristics of memory storing the data on the first storage device in order to match relative rate of access or frequency of use performance requirements for accessing the data on the second storage device to that of relative rate of access or frequency of use performance requirements for the accesses of the data on the first storage device.

18. The non-transitory computer readable medium according to claim 9, wherein the data is stored in the different storage configuration in memory of the second storage device such that relative performance characteristics of the memory storing the data on the second storage device correspond to relative performance characteristics of memory storing the data on the first storage device in order to match relative rate of access or frequency of use performance requirements for accessing the data on the second storage device to that of relative rate of access or frequency of use performance requirements for the accesses of the data on the first storage device.

19. The computer storage system according to claim 16, wherein the data is stored in the different storage configuration in memory of the second storage device such that relative performance characteristics of the memory storing the data on the second storage device correspond to relative performance characteristics of memory storing the data on the first storage device in order to match relative rate of access or frequency of use performance requirements for accessing the data on the second storage device to that of relative rate of access or frequency of use performance requirements for the accesses of the data on the first storage device.

* * * * *